(12) United States Patent
Huang

(10) Patent No.: US 12,382,278 B2
(45) Date of Patent: Aug. 5, 2025

(54) DISPLAY METHOD AND ELECTRONIC DEVICE

(71) Applicant: Honor Device Co., Ltd., Shenzhen (CN)

(72) Inventor: Jinjing Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 240 days.

(21) Appl. No.: 18/021,061

(22) PCT Filed: Oct. 22, 2021

(86) PCT No.: PCT/CN2021/125850
§ 371 (c)(1),
(2) Date: Feb. 13, 2023

(87) PCT Pub. No.: WO2022/042765
PCT Pub. Date: Mar. 3, 2022

(65) Prior Publication Data
US 2023/0300598 A1    Sep. 21, 2023

(30) Foreign Application Priority Data
Aug. 27, 2020  (CN) .......................... 202010880097.5

(51) Int. Cl.
*H04W 4/60* (2018.01)
*H04M 15/00* (2006.01)
*H04W 8/18* (2009.01)

(52) U.S. Cl.
CPC ....... *H04W 8/183* (2013.01); *H04M 15/7556* (2013.01); *H04M 15/854* (2013.01)

(58) Field of Classification Search
CPC ....... H04W 4/60; H04W 8/183; H04W 8/205; H04W 88/06
See application file for complete search history.

(56) References Cited

U.S. PATENT DOCUMENTS 10,129,736 B2   11/2018  Park et al.
10,616,754 B2    4/2020  Fan et al.
(Continued)

FOREIGN PATENT DOCUMENTS

CN         105282732 A    1/2016
CN         110247887 A    9/2019
(Continued)

*Primary Examiner* — Barry W Taylor
(74) *Attorney, Agent, or Firm* — Leydig, Voit & Mayer, Ltd.

(57) ABSTRACT

This application discloses a display method and an electronic device, and relates to the field of terminal technologies. The method includes: sending, by the electronic device in response to a first operation, a profile download request to an operator network; and receiving a profile, where the profile includes profile metadata, and the profile metadata includes at least one field; and in response to a second operation, displaying a first screen on a display based on the profile metadata, where the first screen includes at least one of a first option indicating a network standard, a second option indicating a card type, a third option indicating account balance information of the profile, a fourth option indicating information about a remaining data volume of an account data plan, and a fifth option indicating a state of an account. This allows a user to learn profile capabilities before activating the profile.

18 Claims, 12 Drawing Sheets

(56) References Cited

U.S. PATENT DOCUMENTS

| | | |
|---|---|---|
| 10,820,188 B2 | 10/2020 | Kim et al. |
| 11,064,357 B2 | 7/2021 | Fan et al. |
| 11,259,173 B2 | 2/2022 | Kim et al. |
| 2014/0282019 A1 | 9/2014 | Ramaley et al. |
| 2019/0104401 A1 | 4/2019 | Park et al. |
| 2019/0253884 A1 | 8/2019 | Fan et al. |
| 2020/0037153 A1 | 1/2020 | Anand et al. |
| 2020/0236546 A1 | 7/2020 | Yu et al. |
| 2020/0314635 A1* | 10/2020 | Park .................. H04W 12/35 |
| 2022/0078615 A1* | 3/2022 | Lee .................. H04L 67/303 |
| 2022/0264284 A1* | 8/2022 | Kang .................. H04W 8/183 |
| 2022/0330007 A1 | 10/2022 | Li et al. |
| 2022/0386105 A1* | 12/2022 | Jung .................. H04W 12/45 |
| 2023/0336970 A1* | 10/2023 | Lee .................. H04L 67/303 |

FOREIGN PATENT DOCUMENTS

| | | |
|---|---|---|
| CN | 110621013 A | 12/2019 |
| CN | 111434132 A | 7/2020 |
| CN | 110169028 B | 4/2021 |
| CN | 108353278 B | 5/2021 |
| CN | 108353462 B | 5/2021 |
| EP | 3484197 A1 | 5/2019 |
| WO | 2018021897 A1 | 2/2018 |
| WO | 2019178869 A1 | 9/2019 |

* cited by examiner

DISPLAY METHOD AND ELECTRONIC DEVICE

CROSS-REFERENCE TO RELATED APPLICATIONS

This application is a national stage of International Application No. PCT/CN2021/125850, filed on Oct. 22, 2021, which claims priority to Chinese Patent Application No. 202010880097.5, filed on Aug. 27, 2020. The disclosures of both of the aforementioned applications are hereby incorporated by reference in their entireties.

TECHNICAL FIELD

This application relates to the communications field, and in particular, to a display method and an electronic device.

BACKGROUND

An embedded subscriber identity module (eSIM) is an evolution of the conventional SIM and can be directly integrated into an electronic device (such as a mobile phone and a wearable device) in a form of a chip. A user does not need to insert a conventional SIM into a purchased electronic device integrated with an eSIM, but simply needs to download and enable a profile to use operator services.

However, in the prior art, after the user has downloaded the profile, before the profile is enabled, the electronic device can only obtain and present to the user a few basic attributes of the profile (such as an integrated circuit card identity (iccid), a state of the profile (ProfileState)), which cannot satisfy user needs. For example, in a case that the user has downloaded a plurality of profiles, the user cannot enable a corresponding profile according to his/her own needs.

SUMMARY

Embodiments of this application provide a display method and an electronic device. With a field for characterizing profile capability being added in profile metadata, a user can learn the profile capability without activating the profile after downloading the profile, which helps the user know the profile capability and improve user experience.

According to a first aspect, an embodiment of this application provides a display method, specifically including:
  detecting, by an electronic device, a first operation, where the first operation is used to request downloading a profile, the profile includes profile metadata, and the profile metadata includes at least one of a first field, a second field, a third field, a fourth field, and a fifth field; and the first field is used to indicate a network standard supported by the profile, the second field is used to indicate a card type supported by the profile, the third field is used to indicate account balance information of the profile, the fourth field is used to indicate information about a remaining data volume of an account data plan of the profile, and the fifth field is used to indicate a state of an account of the profile;
  in response to the first operation, sending, by the electronic device, a profile download request to an operator network;
  receiving, by the electronic device, the profile from the operator network;
  detecting, by the electronic device, a second operation, where the second operation is used to open a first screen, and the first screen includes at least one of a first option, a second option, a third option, a fourth option, and a fifth option; and the first option is used to indicate the network standard supported by the profile, the second option is used to indicate the card type supported by the profile, the third option is used to indicate the account balance information of the profile, the fourth option is used to indicate the information about the remaining data volume of an account data plan of the profile, and the fifth option is used to indicate the state of the account of the profile; and
  in response to the second operation, displaying, by the electronic device, the first screen on a display based on the profile metadata.

In this embodiment of this application, field(s) for characterizing profile capabilities (capability), that is, one or more of a first field, a second field, a third field, a fourth field, and a fifth field, are added to profile metadata, so that before a user enables a profile, the electronic device can obtain information for characterizing the profile capabilities and present the information to the user. Therefore, the user can learn the profile capabilities without activating the profile after downloading the profile, which helps the user know the profile capabilities and improve user experience.

In a possible design, if detecting that the first field is used to indicate that the network standard supported by the profile is a first network standard, and/or that the second field is used to indicate that the card type supported by the profile is a first card type, the electronic device pops up a first prompt window on the display, where the first prompt window includes first prompt information, an enable option, and a cancel option, the first prompt information is used to prompt the user whether to enable a profile supporting the first network standard and/or the first card type, the enable option is used for the user to enable the profile, and the cancel option is used for the user to skip enabling the profile. This helps prompt the user of the network standard and/or card type supported by the profile.

In a possible design, if detecting that the third field is used to indicate that the account of the profile is out of credit, the electronic device pops up a second prompt window on the display, where the second prompt window includes second prompt information, a quit option, and an agree option, the second prompt information is used to prompt the user that the account of the profile is out of credit and whether to make a payment, the agree option is used for the user to make a payment to the account, and the quit option is used for the user to skip making a payment to the account. This helps prompt the user whether the account of the profile is out of credit.

In a possible design, if detecting that the fourth field is used to indicate that the account data plan of the profile has been used up, the electronic device pops up a third prompt window on the display, where the third prompt window includes third prompt information, a quit option, and an agree option, the third prompt information is used to prompt the user that the account data plan of the profile has been used up and whether to top up data, the agree option is used for the user to purchase data, and the quit option is used for the user to skip purchasing data. This helps prompt the user whether the account of the profile is out of credit. This helps prompt the user whether the account data plan of the profile has been used up.

In a possible design, if detecting that the fourth field is used to indicate that the account of the profile has been cancelled, the electronic device pops up a fourth prompt window on the display, where the fourth prompt window includes fourth prompt information, a delete option, and a cancel option, the fourth prompt information is used to prompt the user that the account of the profile has been cancelled and whether to delete the account, the delete option is used for the user to delete the profile, and the cancel option is used for the user to skip deleting the profile. This helps prompt the user whether the account of the profile has been cancelled.

In a possible design, the electronic device receives an update notification of the third field from the operator network and based on the update notification of the third field, updates the account balance information of the profile indicated by the third option. This helps improve reliability of the account balance information of the profile presented to the user by the electronic device.

In a possible design, when the account of the profile indicated by the third option is out of credit, a top-up screen is displayed on the display in response to an operation of tapping the third option by the user. This helps the user top up.

In a possible design, the electronic device receives an update notification of the fourth field from the operator network and updates the information about a remaining data volume of the account data plan of the profile indicated by the fourth option based on the update notification of the fourth field.

In a possible design, a data top-up screen is displayed on the display in response to an operation of tapping the fourth option by the user when the account data plan of the profile indicated by the fourth option has been used up. This helps the user top up data.

In a possible design, the first field is nrProfile, the second field is onlyforIoT, the third field is outofCredit, the fourth field is outofDataPlan, and the fifth field is profileCancelled.

According to a second aspect, an embodiment of this application provides an electronic device, specifically including a processor, a memory and a display, where a computer program is stored in the memory, and the processor is configured to call the computer program stored in the memory to execute the following steps:

detecting a first operation, where the first operation is used to request downloading a profile, the profile includes profile metadata, and the profile metadata includes at least one of a first field, a second field, a third field, a fourth field, and a fifth field; and the first field is used to indicate a network standard supported by the profile, the second field is used to indicate a card type supported by the profile, the third field is used to indicate account balance information of the profile, the fourth field is used to indicate information about a remaining data volume of an account data plan of the profile, and the fifth field is used to indicate a state of an account of the profile;

in response to the first operation, sending a profile download request to an operator network;

receiving the profile from the operator network;

detecting a second operation, where the second operation is used to open a first screen, and the first screen includes at least one of a first option, a second option, a third option, a fourth option, and a fifth option; and the first option is used to indicate the network standard supported by the profile, the second option is used to indicate the card type supported by the profile, the third option is used to indicate the account balance information of the profile, the fourth option is used to indicate the information about the remaining data volume of an account data plan of the profile, and the fifth option is used to indicate the state of the account of the profile; and in response to the second operation, displaying the first screen on the display based on the profile metadata.

In a possible design, the processor calls the computer program stored in the memory to further execute the following step:

popping up a first prompt window on the display if it is detected that the first field is used to indicate that the network standard supported by the profile is a first network standard, and/or that the second field is used to indicate that the card type supported by the profile is a first card type, where the first prompt window includes first prompt information, an enable option, and a cancel option, the first prompt information is used to prompt the user whether to enable a profile supporting the first network standard and/or the first card type, the enable option is used for the user to enable the profile, and the cancel option is used for the user to skip enabling the profile.

In a possible design, the processor calls the computer program stored in the memory to further execute the following step:

popping up a second prompt window on the display if it is detected that the third field is used to indicate that the account of the profile is out of credit, where the second prompt window includes second prompt information, a quit option, and an agree option, the second prompt information is used to prompt the user that the account of the profile is out of credit and whether to make a payment, the agree option is used for the user to make a payment to the account, and the quit option is used for the user to skip making a payment to the account.

In a possible design, the processor calls the computer program stored in the memory to further execute the following step:

popping up a third prompt window on the display if it is detected that the fourth field is used to indicate that the account data plan of the profile has been used up, where the third prompt window includes third prompt information, a quit option, and an agree option, the third prompt information is used to prompt the user that the account data plan of the profile has been used up and whether to top up data, the agree option is used for the user to purchase data, and the quit option is used for the user to skip purchasing data.

In a possible design, the processor calls the computer program stored in the memory to further execute the following step:

popping up a fourth prompt window on the display if it is detected that the fourth field is used to indicate that the account of the profile has been cancelled, where the fourth prompt window includes fourth prompt information, a delete option, and a cancel option, the fourth prompt information is used to prompt the user that the account of the profile has been cancelled and whether to delete the account, the delete option is used for the user to delete the profile, and the cancel option is used for the user to skip deleting the profile.

In a possible design, the processor calls the computer program stored in the memory to further execute the following step:

receiving an update notification of the third field from the operator network; and based on the update notification of the third field, updating the account balance information of the profile indicated by the third option.

In a possible design, the processor calls the computer program stored in the memory to further execute the following step:

when the account of the profile indicated by the third option is out of credit, displaying a top-up screen on the display in response to an operation of tapping the third option by the user.

In a possible design, the processor calls the computer program stored in the memory to further execute the following step:

receiving an update notification of the fourth field from the operator network and based on the update notification of the fourth field, updating the account balance information of the profile indicated by the fourth option.

The processor calls the computer program stored in the memory to further execute the following step:

In a possible design, the processor calls the computer program stored in the memory to further execute the following step:

when the account data plan of the profile indicated by the fourth option has been used up, displaying a data top-up screen on the display in response to an operation of tapping the fourth option by the user.

In a possible design, the first field is nrProfile, the second field is onlyforIoT, the third field is outofCredit, the fourth field is outofDataPlan, and the fifth field is profileCancelled.

According to a third aspect, an embodiment of this application provides an electronic device, specifically including a display, a local profile assistant LPA module and an eSIM module; where the LPA module is configured to detect a first operation, and trigger the eSIM module to send a profile download request to an operator network, where the first operation is used to request downloading a profile, the profile includes profile metadata, and the profile metadata includes at least one of a first field, a second field, a third field, a fourth field, and a fifth field; and the first field is used to indicate a network standard supported by the profile, the second field is used to indicate a card type supported by the profile, the third field is used to indicate account balance information of the profile, the fourth field is used to indicate information about a remaining data volume of an account data plan of the profile, and the fifth field is used to indicate a state of an account of the profile;

the eSIM module is configured to receive the profile from the operator network; and the LPA module is further configured to detect a second operation and trigger displaying a first screen on the display based on the profile metadata, where the second operation is used to display the first screen, and the first screen includes at least one of a first option, a second option, a third option, a fourth option, and a fifth option; and the first option is used to indicate the network standard supported by the profile, the second option is used to indicate the card type supported by the profile, the third option is used to indicate the account balance information of the profile, the fourth option is used to indicate the information about the remaining data volume of an account data plan of the profile, and the fifth option is used to indicate the state of the account of the profile.

In a possible design, the LPA is further configured to send a getprofileinfo instruction to the eSIM module, and after receiving the profile metadata from the eSIM module, trigger displaying the first screen on the display based on the profile metadata; and the eSIM module is further configured to return the profile metadata to the LPA module after receiving the getprofileinfo instruction.

In a possible design, if detecting that the first field is used to indicate that the network standard supported by the profile is a first network standard, and/or that the second field is used to indicate that the card type supported by the profile is a first card type, the LPA is further configured to trigger popping up a first prompt window on the display, where the first prompt window includes first prompt information, an enable option, and a cancel option, the first prompt information is used to prompt the user whether to enable a profile supporting the first network standard and/or the first card type, the enable option is used for the user to enable the profile, and the cancel option is used for the user to skip enabling the profile.

In a possible design, if detecting that the third field is used to indicate that the account of the profile is out of credit, the LPA is further configured to trigger popping up a second prompt window on the display, where the second prompt window includes second prompt information, a quit option, and an agree option, the second prompt information is used to prompt the user that the account of the profile is out of credit and whether to make a payment, the agree option is used for the user to make a payment to the account, and the quit option is used for the user to skip making a payment to the account.

In a possible design, if detecting that the fourth field is used to indicate that the account data plan of the profile has been used up, the LPA is further configured to trigger popping up a third prompt window on the display, where the third prompt window includes third prompt information, a quit option, and an agree option, the third prompt information is used to prompt the user that the account data plan of the profile has been used up and whether to top up data, the agree option is used for the user to purchase data, and the quit option is used for the user to skip purchasing data.

In a possible design, if detecting that the fourth field is used to indicate that the account of the profile has been cancelled, the LPA is further configured to trigger popping up a fourth prompt window on the display, where the fourth prompt window includes fourth prompt information, a delete option, and a cancel option, the fourth prompt information is used to prompt the user that the account of the profile has been cancelled and whether to delete the account, the delete option is used for the user to delete the profile, and the cancel option is used for the user to skip deleting the profile.

In a possible design, the eSIM module is further configured to receive an update notification of the third field from the operator network and send an update instruction of the third field to the LPA module; and the LPA module is further configured to receive the update instruction of the third field from the eSIM module and based on the update instruction of the third field, update the account balance information of the profile indicated by the third option.

In a possible design, when the account of the profile indicated by the third option is out of credit, the LPA module is further configured to trigger displaying a top-up screen on the display in response to an operation of tapping the third option by the user.

In a possible design, the eSIM module is further configured to receive an update notification of the fourth field from the operator network and send an update instruction of the fourth field to the LPA module; and the LPA module is further configured to receive the update instruction of the fourth field from the eSIM module and based on the update instruction of the fourth field, update the account balance information of the profile indicated by the fourth option.

In a possible design, the LPA module is further configured to trigger displaying a data top-up screen on the display in response to an operation of tapping the fourth option by the user when the account data plan of the profile indicated by the fourth option has been used up.

In a possible design, the first field is nrProfile, the second field is onlyforIoT, the third field is outofCredit, the fourth field is outofDataPlan, and the fifth field is profileCancelled.

According to a fourth aspect, an embodiment of this application provides an apparatus, where the apparatus includes a processor, configured to implement the method according to the first aspect and any possible design of the first aspect. The apparatus may further include a memory configured to store a computer program. The memory is coupled to the processor. When executing the computer program stored in the memory, the processor may implement the method according to the first aspect and any possible design of the first aspect. The apparatus may further include a communication interface. The communication interface is used by the apparatus to communicate with another device. For example, the communication interface may be a transceiver, a circuit, a bus, a module, or a communication interface of another type. The another device may be a network device, a terminal, or the like.

According to a fifth aspect, an embodiment of this application provides a computer-readable storage medium, where the computer-readable storage medium stores a computer program. When the computer program is executed on a computer, the computer is enabled to perform the method according to the first aspect and any possible design of the first aspect.

According to a sixth aspect, an embodiment of this application provides a computer program product, including a computer program. When the computer program is run on a computer, the computer is enabled to perform the method according to the first aspect and any possible design of the first aspect.

In addition, for technical effects brought by any possible design in the second aspect to the sixth aspect, refer to the technical effects brought by different designs in the method aspect. Details are not described herein again.

DETAILED DESCRIPTION

Figure 1:
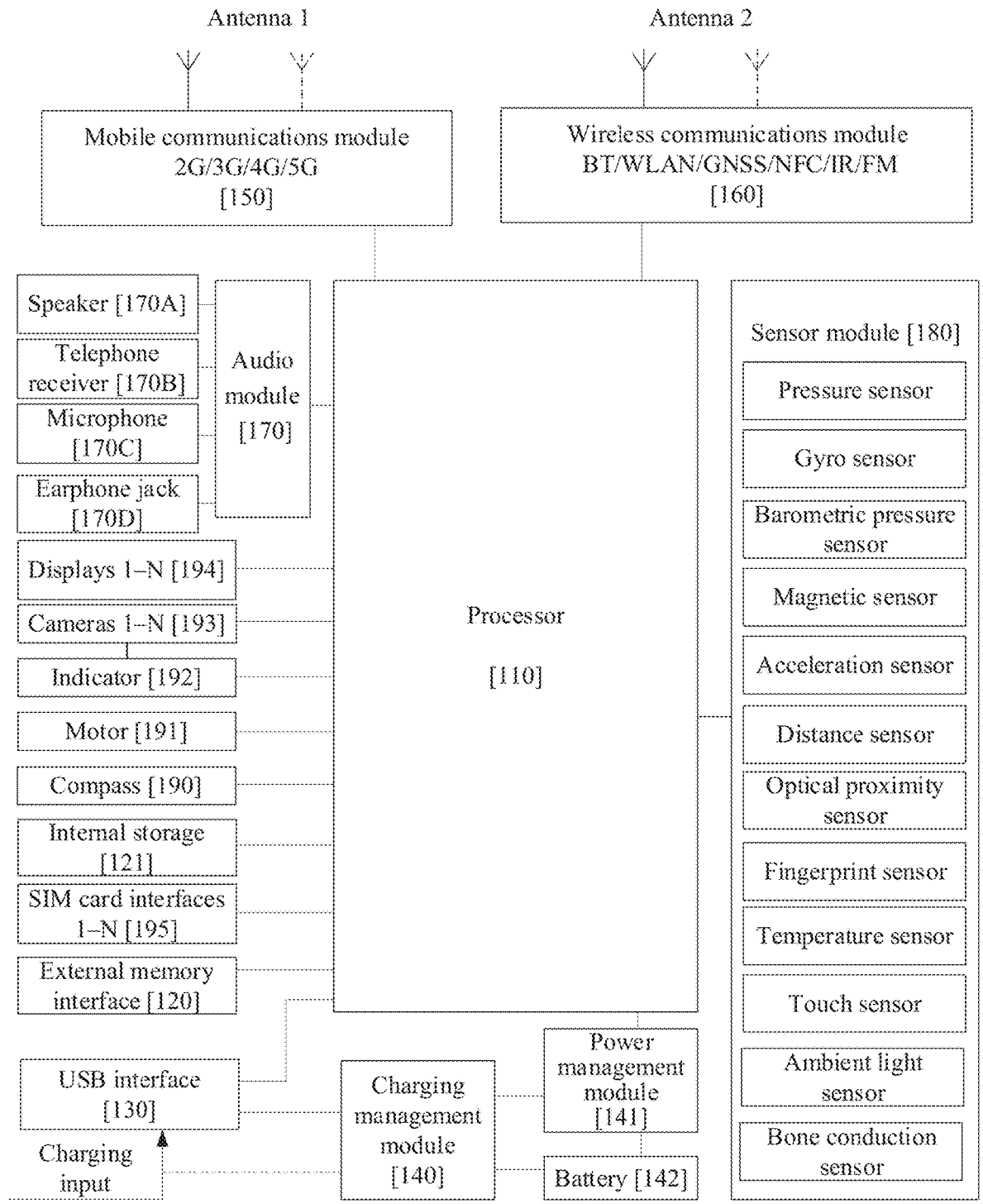
FIG. 1 is a schematic structural diagram of an electronic device according to an embodiment of this application.

For electronic devices integrated or configured with an eSIM, a user does not need to insert a conventional SIM, but simply needs to download and enable a profile to use operator services, for example making a call and accessing the Internet. However, before the user enables the profile downloaded to the electronic device, the electronic device can only obtain content in the profile metadata (Metadata) through a local profile assistant (LPA). The profile metadata specified in an existing protocol is as follows:

```
ProfileInfo ::= [PRIVATE 3] SEQUENCE { -- Tag 'E3'
    iccid Iccid OPTIONAL,
    isdpAid [APPLICATION 15] OctetTo16 OPTIONAL, -- AID of
the ISD-P containing the Profile, tag '4F '
    profileState [112] ProfileState OPTIONAL, -- Tag '9F70'
    profileNickname [16] UTF8String (SIZE(0..64)) OPTIONAL,
    -- Tag '90'
    serviceProviderName [17] UTF8String (SIZE(0..32)) OPTIONAL,
    -- Tag '91'
    profileName [18] UTF8String (SIZE(0..64)) OPTIONAL, -- Tag '92'
    iconType [19] IconType OPTIONAL, -- Tag '93'
    icon [20] OCTET STRING (SIZE(0..1024)) OPTIONAL, -- Tag '94',
see condition in ES10c:GetProfilesInfo
    profileClass [21] ProfileClass OPTIONAL, -- Tag '95'
    notificationConfigurationInfo [22] SEQUENCE OF
NotificationConfigurationInformation OPTIONAL, -- Tag 'B6'
    profileOwner [23] OperatorId OPTIONAL, -- Tag 'B7'
    dpProprietaryData [24] DpProprietaryData OPTIONAL, -- Tag 'B8'
    profilePolicyRules [25] PprIds OPTIONAL, -- Tag '99'
}
```

A value of iccid is used to uniquely identify the profile, and is a physical identifier of the profile; a value of isdpAid is an AID of the profile; a value of profileState is used to characterize a state of the profile, and the state of the profile is used to characterize whether the profile is enabled; a value of profileNickname is an alias of the profile and is a user-defined name of the profile; a value of serviceProviderName is used to characterize a service provider name (usually an operator name) of the profile; a value of profileName is a name of the profile; a value of iconType is used to characterize an icon type of the profile; a value of icon is used to characterize an icon of the profile; and a value of profileClass is used to characterize a type of the profile. Generally speaking, profiles are classified into the following types according to their applications: commercial profiles, test profiles, preset profiles, and the like. A value of notificationConfigurationInfo is a notification parameter of the profile, a parameter used when notifying a network side; a value of profileOwer is used to characterize a home organization of the profile, which generally is an operator; a value of dpProprietaryData is a generated SM-DP+Server ID of the profile; and a value of profilePolicyRules is used to characterize usage strategy of the profile, for example, deletion strategy of the profile.

Therefore, before activating the downloaded profile, the electronic device can only obtain and present to the user a few basic attributes of the profile from the profile metadata. When there are a plurality of downloaded profiles on the electronic device, the user cannot distinguish network standards, service types (such as voice service or data service), card types, or the like supported by different profiles by referring to the basic attributes of the profiles presented by the electronic device, and therefore cannot enable an appropriate profile from the plurality of profiles in a targeted manner according to his/her own needs.

In view of this, an embodiment of this application provides a display method, in which field(s) for characterizing profile capabilities (capability) are added to profile metadata, so that before a user enables a profile, the electronic device can obtain information for characterizing the profile capabilities and present the information to the user. Therefore, the user can learn the profile capabilities without activating the profile after downloading the profile, which helps the user know the profile capabilities and improve user experience. For example, when the user has downloaded a plurality of profiles, the user can select a profile to be enabled in a targeted manner according to his/her own needs with reference to the profile capabilities.

Specifically, in some embodiments, by adding a network standard indication in the profile metadata, the electronic device can obtain the network standard supported by the profile before the user enables the profile. For example, 10 is for 4G and 11 is for 5G. For example, if the network standard supported by the profile includes 4G and 5G, a value of the network standard indication can be 1011 or 1110. For another example, if the network standard supported by the profile is only 4G, a value of the network standard indication can be 0010, 1000, or 10. Alternatively, with nrProfile added in the profile metadata, the electronic device can obtain whether the profile supports 5G before the user enables the profile. For example, nrProfile is used to characterize whether the profile uses profile content of a 5G standard, including content in DSFSGS in TS31102, and satisfies SIMalliance standard for 5G profile. In this case, for example, a value of nrProfile is 1, which is used to characterize that the profile uses profile content of a 5G standard, that is, the profile supports 5G. For another example, a value of nrProfile is 0, characterizing that the profile uses no profile content of a 5G standard, that is, the profile does not support 5G. In some other embodiments, with a service type indication added in the profile metadata, the electronic device can obtain the service type supported by the profile before the user enables the profile. For example, service types supported by the profile may include voice services, data services, and the like. For example, a value of the service type indication is 0, characterizing that the profile only supports the data services but not supports the voice services. For another example, a value of the service type indication is 1, characterizing that the profile supports the data services and the voice services. Alternatively, with onlyforIoT added in the profile metadata, the electronic device can obtain whether the card type supported by the profile is an Internet of Things card before the user enables the profile. For example, in this embodiment of this application, the card types supported by the profile may be classified into Internet of Things card, ordinary card, and the like according to application scenarios or supported services. For example, an Internet of Things card is suitable for an Internet of Things scenario. For example, an Internet of Things card supports the data services but not supports the voice services; and an ordinary card may support the voice services and the data services. For example, onlyforIoT may be used to characterize the card type supported by the profile, or to characterize whether the card type supported by the profile is an Internet of Things card. onlyforIoT for characterizing whether the card type supported by the profile is Internet of Things card is used as an example. For example, a value of onlyforIoT is 1, which is used to characterize that the card type supported by the profile is Internet of Things card. For another example, a value of onlyforIoT is 0, which is used to characterize that the card type supported by the profile is not Internet of Things card (for example, ordinary card or another type of card). onlyforIoT for characterizing a card type supported by the profile is used as an example. In a case that the card types supported by the profile are classified into Internet of Things card, ordinary card, and directional data card according to application scenarios, for example, a value 01 of onlyforIoT is used to characterize that the card type supported by the profile is ordinary card; a value 10 of onlyforIoT is used to characterize that the card type supported by the profile is Internet of Things card; and a value 11 of onlyforIoT is used to characterize that the card type supported by the profile is directional data card. It should be noted that a directional data card is a card that provides a large amount of data for a specific application, for example, Tencent King card.

In addition, in this embodiment of this application, an account out of credit indication, an account subscription state indication, and/or an account data plan usage indication may also be added into the profile metadata. The account out of credit indication may alternatively be referred to as outofCredit for characterizing whether the account of the profile is out of credit. For example, when the account of the profile is out of credit, an operator network may enable outofCredit in the profile metadata, characterizing that the account of the profile is out of credit, and send the profile metadata to the electronic device, so that the electronic device can present the user with prompt information that the account is out of credit. In a case that the account of the profile is not out of credit, the outofCredit in profile metadata is not enabled, characterizing that the account of the profile is not out of credit. For example, a value of outofCredit is 1, indicating that outofCredit is enabled. For another example, a value of outofCredit is 0, indicating that outofCredit is not enabled. Or, in some embodiments, a field for characterizing account balance of a profile is added in the profile metadata, so that the user can know details of the account balance.

The account subscription state indication may alternatively be referred to as profileCancelled, which is used to characterize whether an account of a profile has been cancelled. For example, after the account of the profile has been cancelled, an operator network may enable profileCancelled, characterizing that the account of the profile has been cancelled, and send the profile metadata to the electronic device, so that the electronic device can present the user with prompt information that the profile has been cancelled. In a case that the account of the profile is not cancelled, the profileCancalled in profile metadata is not enabled. For example, a value of profileCancelled is 1, indicating that profileCancelled is enabled. For another example, a value of profileCancelled is 0, indicating that profileCancelled is not enabled.

The account data plan usage indication may alternatively be referred to as outofDataPlan, which is used to characterize whether the account data plan has been used up. For example, when the account data plan of the profile has been used up, that is, when a remaining data volume of the account data plan of the profile is 0, an operator network may enable outofDataPlan in the profile metadata, characterizing that the account data plan of the profile has been used up, and send the profile metadata to the electronic device, so that the electronic device can present the user with prompt information that the account data plan of the profile has been used up. In a case that the account data plan of the profile is not used up, the outofDataPlan in profile metadata is not enabled, characterizing that the account of the profile is not used up. For example, a value of outofDataPlan is 1, indicating that outofDataPlan is enabled. For another example, a value of outofDataPlan is 0, indicating that outofDataPlan is not enabled. Or, in some embodiments, a field for characterizing a remaining data volume of an account data plan of a profile is added in the profile metadata, so that the user can know the detailed remaining data volume of the account data plan.

It should be noted that the embodiments of this application impose no limitation on a name of a field added to the profile metadata.

nrProfile, onlyforIoT, outofCredit, outofDataPlan, profileCancelled of the foregoing fields being added into the profile metadata are used as an example. For example, the profile metadata may be as follows:

```
ProfileInfo ::= [PRIVATE 3] SEQUENCE { -- Tag 'E3'
    iccid Iccid OPTIONAL,
    isdpAid [APPLICATION 15] OctetTo16 OPTIONAL, -- AID of
the ISD-P containing the Profile, tag '4F'
    profileState [112] ProfileState OPTIONAL, -- Tag '9F70'
    profileNickname [16] UTF8String (SIZE(0..64)) OPTIONAL,
    -- Tag '90'
    serviceProviderName [17] UTF8String (SIZE(0..32)) OPTIONAL,
    -- Tag '91'
    profileName [18] UTF8String (SIZE(0..64)) OPTIONAL, -- Tag '92'
    iconType [19] IconType OPTIONAL, -- Tag '93'
    icon [20] OCTET STRING (SIZE(0..1024)) OPTIONAL, -- Tag '94',
see condition in ES10c:GetProfilesInfo
    profileClass [21] ProfileClass OPTIONAL, -- Tag '95'
    notificationConfigurationInfo  [22]  SEQUENCE  OF
NotificationConfigurationInformation OPTIONAL, -- Tag 'B6'
    profileOwner [23] OperatorId OPTIONAL, -- Tag 'B7'
    dpProprietaryData [24] DpProprietaryData OPTIONAL, -- Tag 'B8'
    profilePolicyRules [25] PprIds OPTIONAL, -- Tag '99'
    profileCapability [26] ProfileCapability, -- Tag 'XX'}
    ProfileCapability ::= BIT STRING {
    nrProfile(0),//characterizing whether the profile uses profile content
of a 5G standard
    only ForIOT(1),//characterizing whether the card type of the profile
is Internet of Things card
    outOfCredit(2),//characterizing whether the account of the profile
is out of credit
    outOfDataPlan(3),//characterizing whether the account data plan has
been used up
    profileCancelled(4),//characterizing whether an account of a profile
has been cancelled
    Reserve(5..7)//reserved field
}
```

It should be understood that in the embodiment of this application, "at least one" means one or more. "A plurality of" means two or more than two. "and/or" describes an association relationship of associated objects and represents that three relationships may exist. For example, A and/or B may represent the following three cases: Only A exists, both A and B exist, and only B exists, where A and B may be singular or plural. The character "I" generally indicates an "or" relationship between associated objects. "At least one of the following items (objects)" or a similar expression means any combination of these items, including a single item (object) or any combination of a plurality of items (objects). For example, at least one item (object) of a, b or c can represent the following seven cases: a; b; c; a and b; a and c; b and c; or a, b and c, where each of a, b, c may be an element itself, or a set containing one or more elements.

In the embodiments of this application, phrases such as "for example", "in some embodiments", or "in some other embodiments" are used to represent an example, an instance, or an illustration. Any embodiment or design solution described as "an example" in the embodiments of this application shall not be construed as being more preferential or advantageous than other embodiments or design solutions. Rather, the use of the term "for example" is intended to present a concept in a concrete manner.

It should be noted that words such as "first" and "second" in the embodiments of this application are used merely for distinguishing in descriptions, and shall not be understood as an indication or implication of relative importance, and shall not be understood as an indication or implication of a sequence.

For ease of understanding by a person skilled in art, the following describes some terms used in the embodiments of this application.

1. eSIM The eSIM in the embodiments of this application may alternatively be referred to as an eSIM card, an eSIM chip or an embedded SIM, which is directly integrated into an electronic device in a form of a chip, without user plugging and unplugging, and has networked and remote card writing functions. For example, the eSIM is a universal subscriber identity module (USIM). In addition, the eSIM in the embodiments of this application may be extended to other programmable SIMs, such as softSIM and vSIM.

2. Profile The profile in the embodiments of this application may alternatively be referred to as a configuration file, which is a collection of various data and applications used on the eSIM to provide a user with various operator services, such as voice services or data services, so that the user can use an electronic device to make a call, access the Internet, and the like. Specifically, in some embodiments, the profile may include profile metadata, system files, and/or application programs, and the like. The profile metadata can be obtained from the eSIM by an LPA in the electronic device before the profile is enabled, so as to be presented to the user. Certainly, the profile metadata can alternatively be obtained from the eSIM by the LPA after the profile is enabled. The system files may include a master file (MF), dedicated files (DFs), and the like, which can be obtained by the LPA from the eSIM after the profile is enabled, but cannot be obtained by the LPA before the profile is enabled. For example, the applications may include a network access application NAA, a security domain name Security Domain, other non-communication services, and the like.

3. Embedded universal integrated circuit card (eUICC) In the embodiments of this application, the eUICC is used to store profiles. Usually, the terms eUICC and eSIM are often exchangeable. In fact, an eUICC refers to a physical chip, and an eSIM refers to an application that stores user subscription information on the eUICC. The eUICC is a physical entity of the eSIM. For ease of understanding, the eSIM is uniformly used in this application for description.

It should be noted that the electronic device in the embodiments of this application may be a mobile phone, a tablet computer, a wearable device, an in-vehicle device, an augmented reality (AR)/virtual reality (VR) device, a notebook computer, an ultra-mobile personal computer (UMPC), a netbook, a personal digital assistant (PDA), or the like. The embodiments of this application impose no limitation on a specific type of the electronic device.

For example, FIG. 1 is a schematic structural diagram of an electronic device according to an embodiment of this application. Specifically, as shown in the figure, the electronic device includes a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a key 190, a motor 191, an indicator 192, a camera 193, a display 194, and the like. The sensor module 180 may include a pressure sensor, a gyro sensor, a barometric pressure sensor, a magnetic sensor, an acceleration sensor, a distance sensor, a proximity light sensor, a fingerprint sensor, a temperature sensor, a touch sensor, an ambient light sensor, a bone conduction sensor, and the like.

The processor 110 may include one or more processing units. For example, the processor 110 may include an application processor (AP), a modem, a graphics processing unit (GPU), an image signal processor (ISP), a controller, a video codec, a digital signal processor (DSP), a baseband processor, a neural-network processing unit (NPU), and/or the like. Different processing units may be separate devices, or two or more different processing units may be integrated into one device.

The controller may be a nerve center and command center of the electronic device. The controller may generate an operation control signal according to an instruction operation code and a timing signal, to complete control of instruction fetching and execution.

A memory may be further provided in the processor 110 to store instructions and data. In some embodiments, the memory in the processor 110 is a cache memory. The memory may store instructions or data that the processor 110 has just used or used repeatedly. If the processor 110 needs to use the instructions or the data again, the processor 110 may directly call the instructions or the data from the memory, thereby avoiding repeated access, reducing waiting time of the processor 110, and improving system efficiency.

In some embodiments, the processor 110 may include one or more interfaces. For example, the processor 110 includes a universal serial bus (USB) interface 130 and a subscriber identity module (SIM) interface 195. For another example, the processor 110 may further include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, and/or the like.

It can be understood that an interface connection relationship between the modules illustrated in this embodiment of this application is merely an example for description, and constitutes no limitation on the structure of the electronic device. In some other embodiments of this application, the electronic device may alternatively use an interface connection manner different from that in the foregoing embodiment, or a combination of a plurality of interface connection manners.

The USB interface 130 is an interface that complies with the USB standard specification, and specifically may be a Mini USB interface, a Micro USB interface, a USB Type C interface, or the like. The USB interface 130 may be configured to connect a charger to charge the electronic device, and may also be configured to transmit data between the electronic device and a peripheral device. The USB interface 130 may also be configured to connect an earphone, to play audio by using the earphone. The USB interface may be further configured to connect another electronic device, for example, an AR device.

The electronic device uses an eSIM. The eSIM is embedded into the electronic device and cannot be separated from the electronic device. Specifically, one eSIM can store or enable one or more profiles. For example, a maximum number of stored or enabled profiles supported by an eSIM depends on a card issuer or an operator. Profiles stored in the eSIM may include a profile downloaded by the user according to his/her own needs, or a profile preset before the electronic device leaves the factory, or the like, which is not limited. In addition, a profile in the eSIM may also be deleted according to user needs. For example, after the account of the profile is cancelled, the user can operate the electronic device to delete the account. Specifically, the electronic device may delete the profile with a cancelled account in response to an operation of deleting the profile with a cancelled account by the user. In some embodiments, the electronic device may also include a subscriber identification module (SIM) card interface 195 for connecting to a conventional SIM. The conventional SIM card may be inserted into the SIM card interface 195 or removed from the SIM card interface 195 to implement contact with or separation from the electronic device. The electronic device may support two or N SIM card interfaces, where N is a positive integer greater than 2. Conventional SIMs may include Nano SIMs, Micro SIMs, SIMs, and the like. A plurality of SIM cards may be inserted into a same SIM card interface 195 at the same time. The plurality of SIM cards may be of a same type or of different types. The SIM card interface 195 may also be compatible with different types of SIMs. The SIM card interface 195 may also be compatible with an external memory card. The electronic device interacts with a network by using a SIM card, to implement functions such as calling and accessing the Internet.

The charging management module 140 is configured to receive charging input from a charger. The charger may be a wireless charger or a wired charger. In some wired charging embodiments, the charging management module 140 may receive charging input from a wired charger by using the USB interface 130. In some wireless charging embodiments, the charging management module 140 may receive wireless charging input through a wireless charging coil of the electronic device. The charging management module 140 may also supply power to the electronic device through the power management module 141 while charging the battery 142.

The power management module 141 is configured to connect to the battery 142, the charging management module 140, and the processor 110. The power management module 141 receives input from the battery 142 and/or the charging management module 140, to supply power to the processor 110, the internal memory 121, an external memory, the display 194, the camera 193, the wireless communications module 160, and the like. The power management module 141 may also be configured to monitor parameters such as a battery capacity, a quantity of battery cycles, and a battery state of health (electric leakage and impedance). In some other embodiments, the power management module 141 may alternatively be provided in the processor 110. In some other embodiments, the power management module 141 and the charging management module 140 may alternatively be provided in a same device.

A wireless communication function of the electronic device may be implemented by using the antenna 1, the antenna 2, the mobile communications module 150, the wireless communications module 160, the modem, the baseband processor, and the like.

The antenna 1 and the antenna 2 are configured to transmit and receive an electromagnetic wave signal. Each antenna of the electronic device may be configured to cover one or more communication bands. Different antennas may each be used for multiple purposes to improve antenna utilization. For example, the antenna 1 may also be used as a diversity antenna of a wireless local area network. In some other embodiments, the antenna may be used in combination with a tuning switch.

The mobile communications module 150 may provide a solution that is applied to the electronic device and that includes wireless communications technologies such as 2G, 3G, 4G, and 5G. The mobile communications module 150 may include at least one filter, a switch, a power amplifier, a low noise amplifier (LNA), and the like.

The wireless communications module 160 may provide a solution that is applied to the electronic device and that includes wireless communication technologies such as wireless local area network (WLAN) (for example, Wi-Fi network), Bluetooth (BT), global navigation satellite system (GNSS), frequency modulation (FM), near field communication (NFC) technology, and infrared (IR) technology.

In some embodiments, in the electronic device the antenna 1 is coupled to the mobile communications module 150, and the antenna 2 is coupled to the wireless communications module 160, so that the electronic device can communicate with a network and other devices by using a wireless communications technology. The wireless communications technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, IR technology, and/or the like. The GNSS may include the global positioning system (GPS), the global navigation satellite system (GLONASS), the Beidou navigation satellite system (BDS), the quasi-zenith satellite system (QZSS), and/or the satellite based augmentation systems (SBAS).

The electronic device implements a display function by using the GPU, the display 194, the application processor, and the like. The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), and the like. In some embodiments, the electronic device may include one or N displays 194, where N is a positive integer greater than 1.

The electronic device may implement a shooting function by using the ISP, the camera 193, the video codec, the GPU, the display 194, the application processor, and the like. The ISP is configured to process data fed back by the camera 193. For example, during photographing, a shutter is opened, light is transmitted to a photosensitive element of the camera through a lens, an optical signal is converted into an electrical signal, and the photosensitive element of the camera transfers the electrical signal to the ISP for processing, to convert the electrical signal into an image visible to naked eyes. The ISP may further optimize noise, brightness, and skin tone of the image using algorithms. The ISP may further optimize parameters such as exposure and a color temperature of a shooting scene. In some embodiments, the ISP may be disposed in the camera 193.

The camera 193 is configured to capture a static image or a video. An optical image is generated for an object by using the lens, and is projected onto the photosensitive element. The photosensitive element may be a charge coupled device (CCD) or a complementary metal-oxide semiconductor (CMOS) phototransistor. The photosensitive element converts an optical signal into an electrical signal, and then transfers the electrical signal to the ISP which converts the signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The external memory interface 120 may be configured to connect an external storage card, for example, a micro SD card, to extend a storage capacity of the electronic device. The external memory card communicates with the processor 110 through the external memory interface 120, to implement a data storage function, for example, storing files such as music and video files in the external storage card.

The internal memory 121 includes an operating memory and a built-in memory. The operating memory may be configured to store program instructions, data, or the like. The processor 110 runs the instruction stored in the operating memory, to implement various function applications and data processing of the electronic device. For example, the operating memory may include a high-speech random access memory. The built-in memory may alternatively be referred to an internal storage, and may be configured to store program instructions and/or data. For example, the built-in memory may store an operating system, an application, and the like. The electronic device generally loads program instructions and/or data in the built-in memory into the operating memory, so that the processor 110 executes a corresponding program instruction and/or data to implement a corresponding function. In addition, the internal memory 121 may include a non-volatile memory, for example, at least one magnetic disk storage device, a flash memory device, or a universal flash storage (UFS).

The electronic device may implement an audio function by using the audio module 170, the speaker 170A, the telephone receiver 170B, the microphone 170C, the headset jack 170D, the application processor, and the like. for example, music playing or sound recording.

The key 190 includes a power on/off key, a volume key, and the like. The key 190 may be a mechanical key or a touch key. The electronic device may receive a key-based input, and generate a key signal input related to user setting and function control of the electronic device.

The motor 191 may generate a vibration alert. The motor 191 may be configured to provide a vibration alert for an incoming call, and may also be configured to provide a vibration feedback on a touch. For example, touch operations acting on different applications (for example, photographing and audio playing) may correspond to different vibration feedback effects. The motor 191 may also correspondingly provide different vibration feedback effects for touch operations acting on different areas of the display 194. Different application scenarios (for example, time reminder, message reception, alarm clock, and gaming) may also correspond to different vibration feedback effects. In addition, touch vibration feedback effects can be user-defined.

The indicator 192 may be an indication lamp and may be configured to indicate a charging state, a power change, a message, a missed call, a notification, and the like.

It can be understood that the structure illustrated in this embodiment of this application does not constitute a specific limitation on the electronic device. In some other embodiments of this application, the electronic device may include more or fewer components than those shown in the figure, or combine some components, or split some components, or have a different component arrangement. The components shown in the figure may be implemented by using hardware, software, or a combination of software and hardware.

Figure 2:
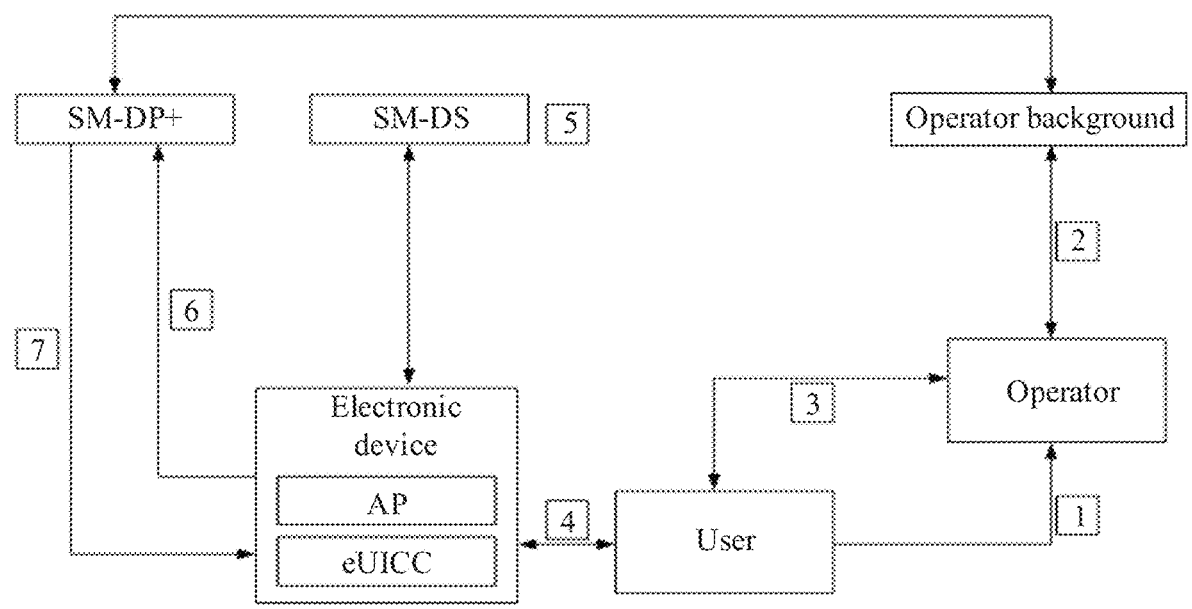
FIG. 2 is a schematic structural diagram of an eSIM remote management system architecture according to an embodiment of this application.

FIG. 2 is a schematic structural diagram of an eSIM remote management system architecture according to an embodiment of this application. As shown in FIG. 2, an eSIM remote management system architecture according to an embodiment of this application includes an electronic device, a user, a mobile network operator (for ease of description, which may be referred to as an operator hereinafter), an operator background (server), a subscription manager data preparation plus SM-DP+, and a subscription manager discovery server SM-DS.

For example, the electronic device downloads a profile from an operator network through the following steps:

1. The user and the operator sign a network service agreement, so that, for example, a service can be subscribed through a network;
2. The operator updates data information in an operator background (server) based on the network service agreement signed with the user, for example, allocating an ICCID, an ISP D-AID and other related information;
3. The operator informs the user to download a service, for example, the operator may provide a network service accessible to the user;
4. The electronic device is connected to a subscription manager discovery server SM-DS;
5. The electronic device obtains an address of a subscription manager data preparation plus SM-DP+ (which may be a plurality of SM-DP+ addresses) from the subscription manager discovery server SM-DS;
6. Based on the obtained SM-DP+ address, the electronic device sends a profile download request to the subscription manager data preparation plus SM-DP+ through the eSIM; and
7. In response to the profile download request, the subscription manager data preparation plus SM-DP+ sends a corresponding profile to the eSIM in the terminal device, so that the electronic device can perform voice services or data services after activating the profile.

In some embodiments, the eSIM can download a plurality of profiles. For example, the user may sign network service agreements with a plurality of operators, or sign a plurality of network service agreements with one operator. In some embodiments, one profile may correspond to one mobile phone number. In some embodiments, the eSIM may change parameter information within the card, for example by changing the profile. In some embodiments, the profile may be serviced by different mobile operators.

In some embodiments, before the voice service or the data service is performed, the electronic device may enable a corresponding profile in response to an operation of enabling (Enable) the profile by the user. For example, if the user does not need to use a mobile phone number, the user may perform a disabling (Disable) operation on the corresponding profile. In some embodiments, the user may select a mobile phone number and perform an operation, for example, enable or disable, on the profile. It should be noted that, in this embodiment of this application, other operations may also be performed to enable or disable the corresponding profile.

An embodiment of this application is described in detail below with reference to a screen shown in FIG. 3.

Figure 3:
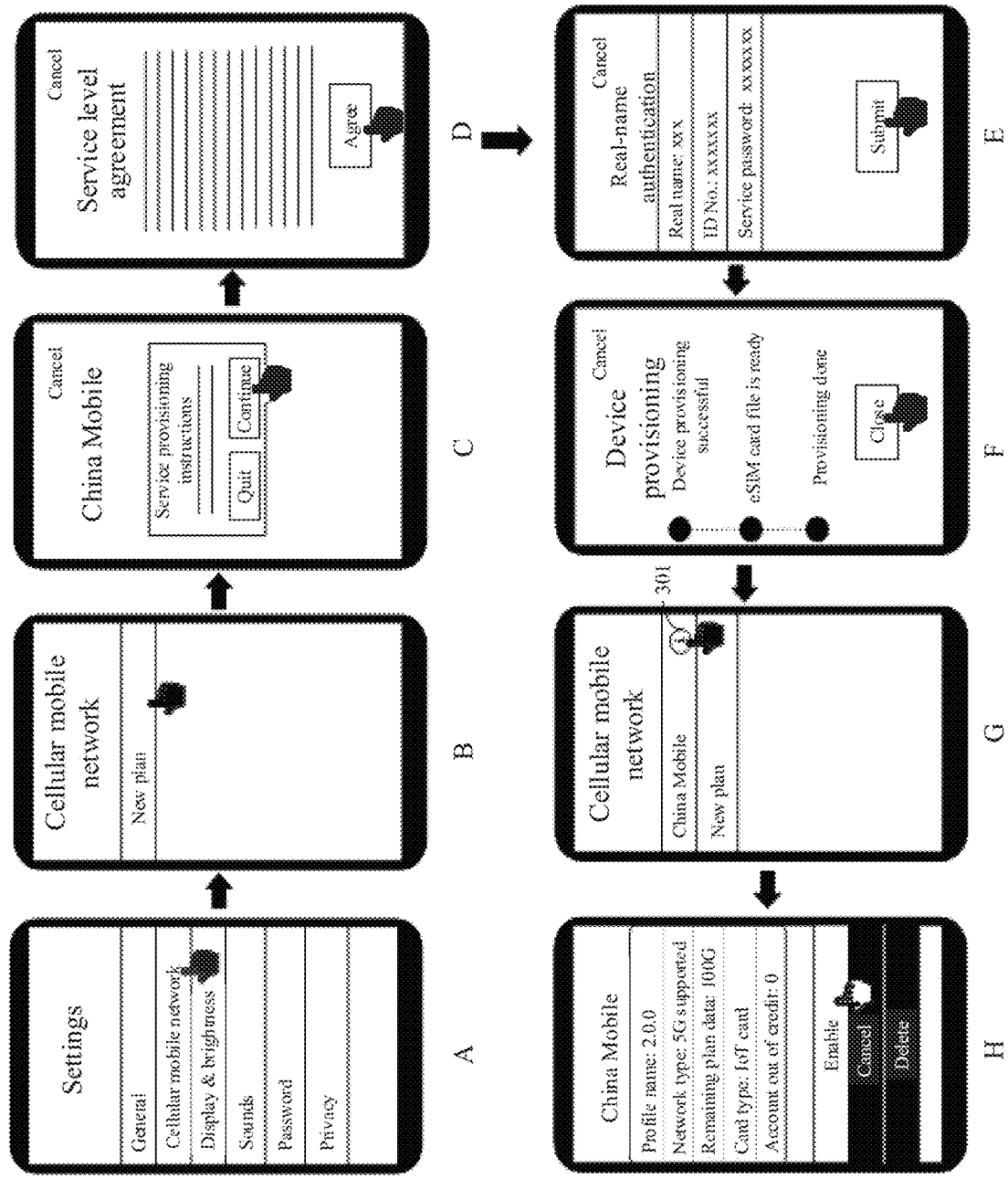
FIG. 3 is a schematic diagram of a screen according to an embodiment of this application.

As shown in FIG. 3, a screen A is a system settings screen of an electronic device, which may include one or more setting options, such as General, Cellular mobile network, Display & brightness, Sounds, Password, and Privacy. The user taps the Cellular mobile network option, and if there is no profile downloaded on the electronic device, the electronic device displays a screen B on the display in response to the operation of tapping on the Cellular mobile network option by the user. The screen B is a Settings screen of the Cellular mobile network. The screen B includes a new plan option. The user can tap the new plan option, so that the electronic device initiates a process to the operator network of downloading a profile. For example, the electronic device displays a screen C on the display in response to a tap by the user on the new plan option. The screen C is a screen for operator-related service provisioning instructions. The electronic device may display a screen D on the display in response to an operation of tapping the continue option by the user. The screen D is a description page of a service level agreement. Then, the user taps the agree option on the screen D, so that the electronic device displays a screen E on the display in response to the operation of tapping the agree option by the user. The screen E is a screen for real-name authentication. The user inputs relevant information (such as real name, ID number, and service password) on the screen D and taps a submit option, so that the electronic device sends a profile download request to the operator network in response to the operation of tapping the submit option by the user and displays a screen on the display, showing a progress of device provisioning. When the electronic device displays a screen F on the display, the electronic device completes the profile download. Specifically, the profile downloaded by the electronic device from the operator network is stored in the eSIM. The user taps a close option on the screen F, so that the electronic device displays a screen G on the display in response to the operation of tapping the close option on the screen F by the user. The screen G is a Settings screen of the Cellular mobile network, a screen after the screen B is updated.

For example, after completing the profile download, the electronic device may add a plan option on the screen B in response to a tap by the user on the close option on the screen F, and display the plan on the display. As an example, the plan option is China Mobile. The electronic device displays a screen G on the display in response to a tap by the user on the close option on the screen F. It should be noted that the screen B and the screen G are the same screen. Alternatively, the electronic device may add a plan option of China Mobile on the screen B after completing the profile download, and after the user taps the close option on the screen F, the electronic device displays the screen G on the display.

In a case that a field for indicating profile capabilities is added in the profile metadata, the user can tap a control 301 for the China Mobile plan option, so that the electronic device displays profile capability information on the display. Taking nrProfile, onlyforIoT, outofCredit, outofDataPlan and profileCancelled as examples of added fields for indicating the profile capabilities, in a case that in the profile downloaded by the electronic device, nrProfile is used to indicate that 5G is supported, outofIoT to indicate that the card type is Internet of Things card, outofCredit to indicate that an account of the profile is not out of credit, outofDataPlan to indicate that an account data plan of the profile has not been used up, and profileCancelled to indicate that the account of the profile has not been cancelled, the electronic device displays a screen H on the display in response to a tap by the user on the control 301 for the China Mobile plan option.

Because the user can view the network standard and the card type supported by the profile and the like on the screen H, the user can refer to the profile capability information and determine whether to enable the profile based on his/her own needs. For example, if the user needs to enable an Internet of Things card that supports 5G and in the downloaded profile displayed on the screen H, supported network standards include 5G and a supported card type is 5G, the user can tap the enable option on the screen H, so that the electronic device enables the profile.

In some embodiments, the electronic device may automatically obtain the profile metadata after the profile is downloaded, and generate the screen H based on the profile metadata. Then the electronic device displays the screen H on the display in response to a tap by the user on the control 301. Alternatively, after the profile is downloaded, the electronic device may obtain the profile metadata in response to the operation of tapping the control 301 by the user, generate the screen H based on the profile metadata, and then display the screen H on the display.

For example, in this embodiment of this application, the electronic device obtains the profile metadata from the eSIM through an LPA. The LPA may obtain the profile metadata from the eSIM in response to a user operation or after detecting that the eSIM has received the profile from the operator network. For example, the LPA can periodically detect whether the eSIM has received a profile from the operator network. A periodicity for which the LPA detects whether the eSIM has received a profile from the operator network may be predefined, or may be determined by the terminal device based on its own capabilities, which is not limited.

Figure 4:
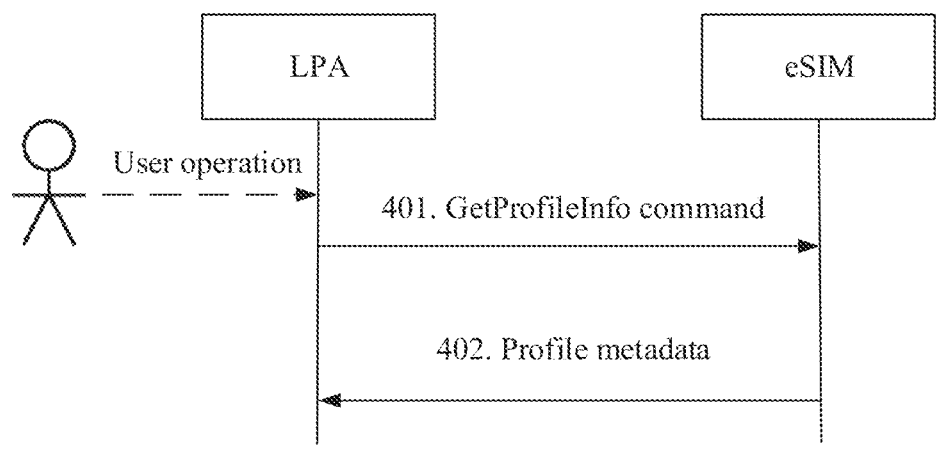
FIG. 4 is a schematic flowchart of a method for obtaining profile metadata according to an embodiment of this application.

For example, as shown in FIG. 4, the LPA can obtain the profile metadata from the eSIM through the following steps:
  401. The LPA sends a GetProfileInfo command (GetProfileInfo command) to the eSIM, where
  the LPA may send a GetProfileInfo command to the eSIM in response to an operation by the user (for example, an operation of tapping the control 301 by the user), or, the LPA may periodically send the GetProfileInfo command to the eSIM or actively send the GetProfileInfo command to the eSIM after detecting that the eSIM has received the profile or profile metadata from the operator network; and
  402. The eSIM receives the GetProfileInfo command and returns the profile metadata (Profile Metadata) to the LPA.

Then, based on the profile metadata obtained by the LPA, the electronic device presents corresponding profile capability information to the user on a corresponding screen, or pops up a prompt box to prompt the user for the corresponding profile capability information, so that the user can be informed.

For example, in the screens shown in FIG. 3, the user can alternatively tap the new plan option on the screen B to skip the screens C, D and E, that is, to initiate the process of downloading the profile from the operator network without real-name authentication. The screens C, D, and E may be web pages provided by the operator, or screens of an application of the operator. The screens A, B, E, G and H may be Settings screens of the electronic device.

In some other embodiments, the electronic device may also obtain the profile metadata during the device provisioning. When some fields in the profile metadata are used to indicate some special information, a corresponding prompt box pops up on the display to give a corresponding prompt to the user. It should be understood that during the device provisioning of the electronic device, for the method for obtaining the profile metadata, reference may be made to the method shown in FIG. 4, but it should be noted that during the device provisioning of the electronic device, the LPA actively triggers sending the GetProfileInfo command to the eSIM.

Figure 5:
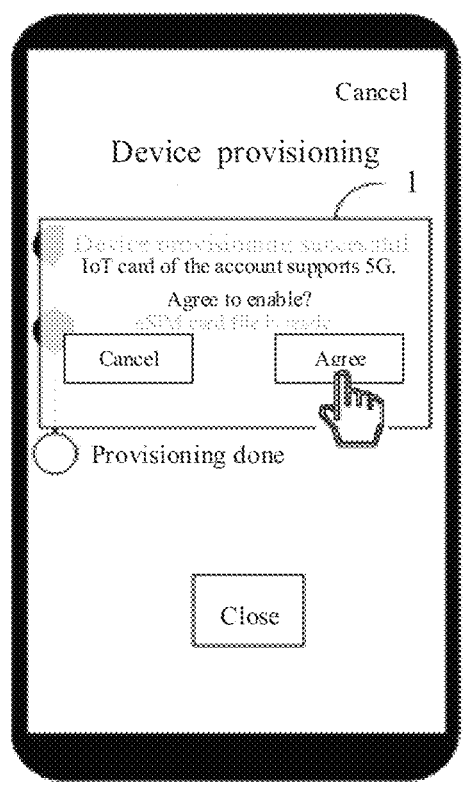
FIG. 5 is a schematic diagram of another screen according to an embodiment of this application.

For example, in a case that nrProfile in the profile metadata is used to indicate that the profile supports 5G and/or onlyforIoT is used to indicate that the card type supported by the profile is a physical network card, the electronic device pop ups a prompt box 1 on the display. The prompt box 1 is used to prompt the user that the network standard supported by the profile currently downloaded by the electronic device is 5G, and/or the card type is Internet of Things card. During the device provisioning, the user can operate the electronic device to enable or skip enabling the profile according to his/her own needs. For example, the prompt box 1 may be as shown in FIG. 5, and the user may tap the agree option so that the electronic device enables the profile. Therefore, the user can directly use the electronic device after completion of the device provisioning, without enabling the profile again. Or, the user may skip enabling the profile by tapping the cancel option, and the user can subsequently enable the appropriate profile when required through the Settings screen of the Cellular mobile network.

Figure 6:
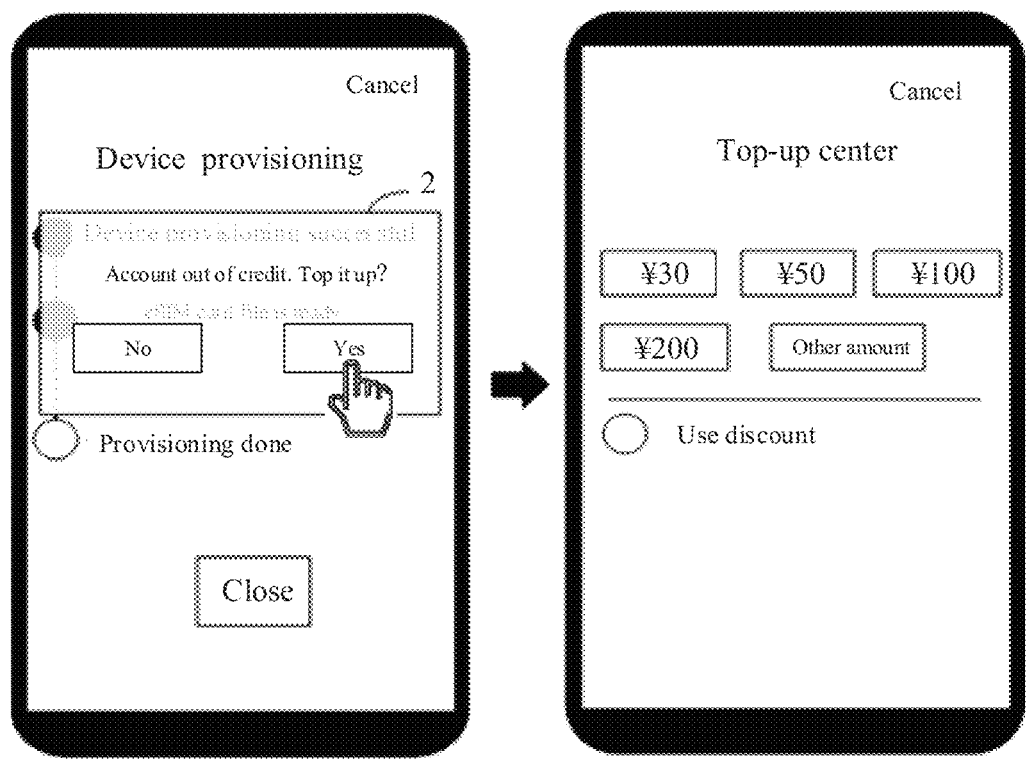
FIG. 6 is a schematic diagram of another screen according to an embodiment of this application.

For another example, in a case that the outofCredit in the profile metadata is used to indicate that the account of the profile is out of credit, the electronic device may automatically pop up a prompt box 2. The prompt box 2 is used to prompt the user that the account is out of credit and whether to make a payment. For example, the prompt box 2 may be as shown in FIG. 6. The user may tap a Yes option, so that the electronic device may display a top-up screen for a corresponding operator on the display based on a field (for example, serviceProviderName) used to indicate the operator to which the profile belongs in the profile metadata. The user may top up by selecting a corresponding amount on the top-up screen according to his/her own needs.

Figure 7:
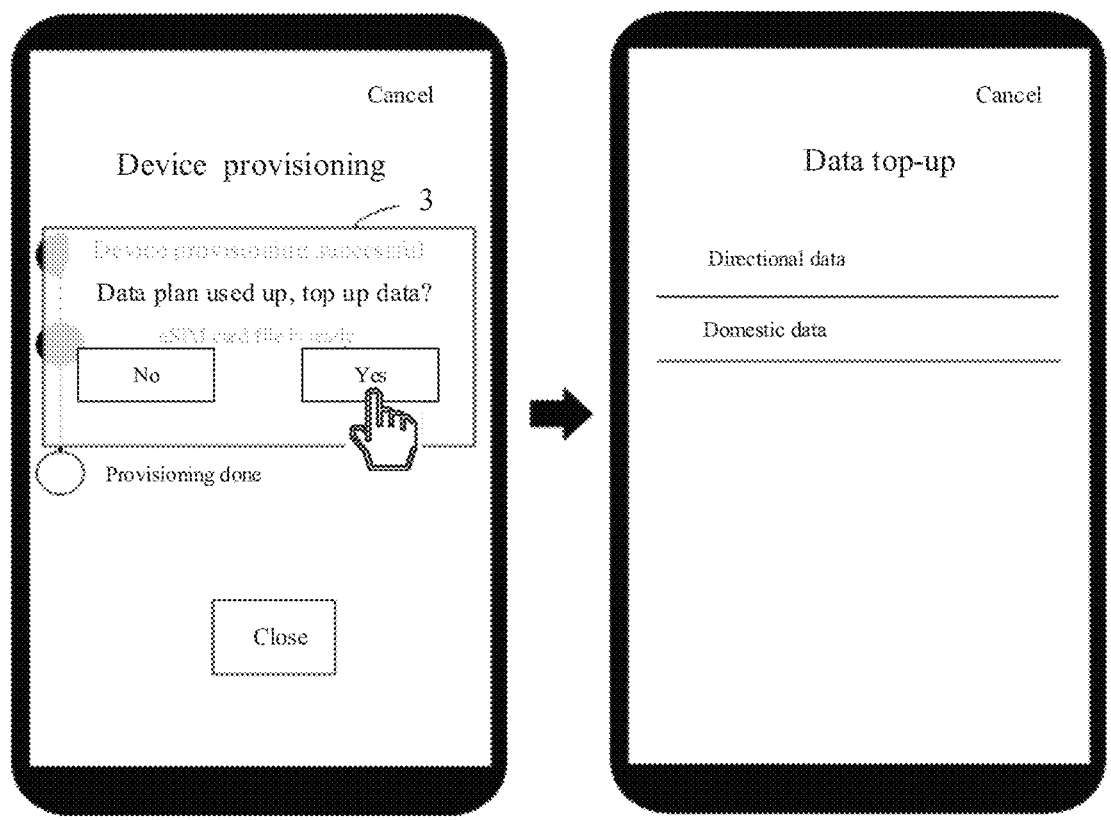
FIG. 7 is a schematic diagram of another screen according to an embodiment of this application.

For another example, in a case that the outofDataPlan in the profile metadata is used to indicate that an account data plan of the profile has been used up, the electronic device may automatically pop up a prompt box 3. The prompt box 3 is used to prompt the user that the account data plan has been used up and whether to top up data. For example, the prompt box 3 may be as shown in FIG. 7. The user may tap the Yes option, so that the electronic device may display a data top-up screen for a corresponding operator on the display based on a field (for example, serviceProviderName) used to indicate the operator to which the profile belongs in the profile metadata. The user may make a choice on the data top-up screen according to his/her own needs, to purchase corresponding data such as directional data and domestic data.

Figure 8:
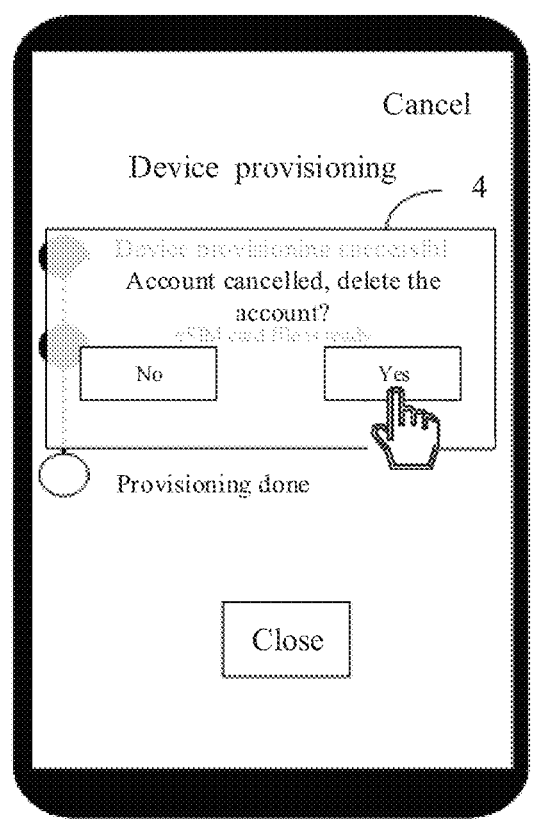
FIG. 8 is a schematic diagram of another screen according to an embodiment of this application.

For another example, in a case that the profileCancelled in the profile metadata is used to indicate that the account of the profile has been cancelled, the electronic device may automatically pop up a prompt box 4. The prompt box 4 is used to prompt the user that the account has been cancelled and whether to delete the account. For example, the prompt box 4 may be as shown in FIG. 8. The user may tap the Yes option, so that the electronic device may delete the profile, and the service provisioning fails. For example, after the user has downloaded Profile1 by using a mobile phone 1, enabled and used the Profile1 for a period of time, the user cancelled the Profile1, and replaced a new mobile phone (taking a mobile phone 2 as an example). The user performs service provisioning on the mobile phone 2 and due to a misoperation, downloads a previously cancelled Profile1. Because a new field profileCancelled is added in the profile metadata, the electronic device may prompt the user during the provisioning that the account of the Profile1 has been cancelled, to prevent the user from failing to enable the Profile1 after the Profile1 has been downloaded.

Figure 9:
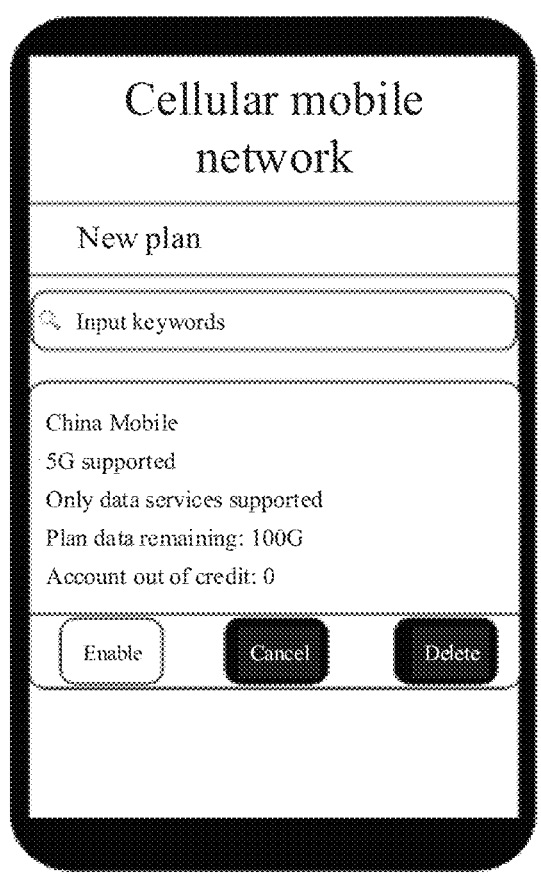
FIG. 9 is a schematic diagram of another screen according to an embodiment of this application.

In addition, in some other embodiments, the screen G shown in FIG. 3 may alternatively be replaced with the screen shown in FIG. 9, thereby helping to reduce user operations, so that the user may directly view the screen shown in FIG. 9 in a case that there are a plurality of downloaded profiles.

The screen shown in FIG. 9 is used as an example. In some embodiments, in a case that the profile is enabled, if the user taps the enable option, the electronic device may deactivate or disable the profile in response to the operation of tapping the enable option by the user, so that the profile is in a disabled state. For example, a color of the enable option when the profile is enabled may be different from a color of the enable option when the profile is disabled, and/or a text on the enable option when the profile is enabled is different from a text on the enable option when the profile is disabled, so that the user can distinguish whether the profile is enabled. For example, when the profile is enabled, the color of the enable option is white, and when the profile is disabled, the color of the enable option is white. For another example, when the profile is enabled, the text on the enable option is "Disable", and when the profile is not enabled, the text on the enable option is "Enable".

In some embodiments, the screen shown in FIG. 9 may further include a search box, so that the user can search for a corresponding profile in a targeted manner according to his/her own needs. For example, if the user needs to enable a profile that only supports data services, the user may input "support data services only" in the search box. In response to the input of "support data services only" in the search box, the electronic device only displays information about a profile that only supports data services on the screen shown in FIG. 9. For another example, if "5G supported" is input in the search box, in response to the input of "5G supported" in the search box, the electronic device displays information about a profile that supports 5G on the screen shown in FIG. 9. Further, after the user deletes the keyword input in the search box, the electronic device displays information about all stored profiles on the eSIM on the display.

In some other embodiments, the screen shown in FIG. 9 may further include a cancel option and/or a delete option, so that when the user does not need to use the enabled profile, the user may cancel the corresponding profile. For example, in a case that the account of the profile account has not been cancelled, the electronic device may initiate a process to the operator network of cancelling the profile in response to the operation of tapping the cancel option by the user. Further, the electronic device may further display a profile account cancellation prompt window on the display in response to the operation of tapping the cancel option by the user, where the profile account cancellation prompt window is used to prompt the user to reconfirm whether to cancel the account of the profile. The electronic device initiates a process to the operator network of cancelling the profile in response to the operation of confirming to cancel the account of the profile by the user, to avoid a misoperation by the user. In a case that the user skips cancelling the account of the profile, the electronic device no longer initiates a process to the operator network of cancelling the profile, in response to the operation by the user of confirming to skip cancelling the account of the profile.

After cancelling the profile, the operator network enables the field profileCancelled in the profile metadata, so that a value of profileCancelled is used to indicate that the profile has been cancelled, and the electronic device is notified to update the field profileCancelled. After updating the field profileCancelled, the electronic device may update a screen for displaying profile capability information based on the updated field profileCancelled. As an example, a screen for displaying the profile capability information before the field profileCancelled is updated is the screen shown in FIG. 8. The electronic device may update the screen shown in FIG. 9 to the screen shown in FIG. 10 based on the updated field profileCancelled in response to an operation of opening the screen shown in FIG. 8 after the field profileCancelled is updated. Or, further, in some embodiments, after updating the field profileCancelled, the electronic device pops up a prompt window on the display, indicating to the user that the account of the profile has been cancelled.

Figure 11:
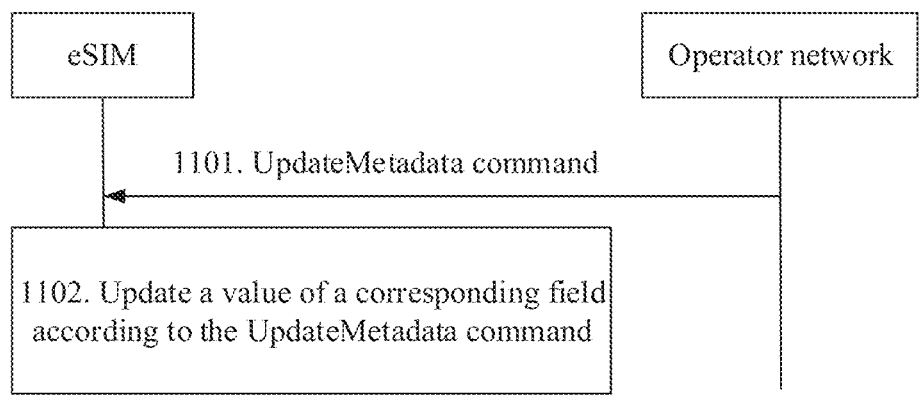
FIG. 11 is a schematic flowchart of a method for updating the profile metadata according to an embodiment of this application.

For example, the operator network may notify the electronic device to update the corresponding field by using the method shown in FIG. 11. Taking profileCancelled as an example, operations specifically include:

1101. The operator network sends an update metadata command (UpdateMetadata command) to the eSIM in the electronic device through OTA, where the UpdateMetadata command is used to indicate updating of the value used for profileCancelled in the profile metadata; and 1102. After receiving the UpdateMetadata command from the operator network, the eSIM updates the value of the profileCancelled in the stored profile metadata according to the UpdateMetadata command.

After updating the value of the profileCancelled in the stored profile metadata, the eSIM of the electronic device may actively send the updated value of profileCancelled to the LPA, so that the LPA updates the corresponding screen in a timely manner. Alternatively, the LPA may obtain the corresponding profile metadata from the eSIM by using the method shown in FIG. 4. This embodiment of this application imposes no limitation thereon.

Figure 10:
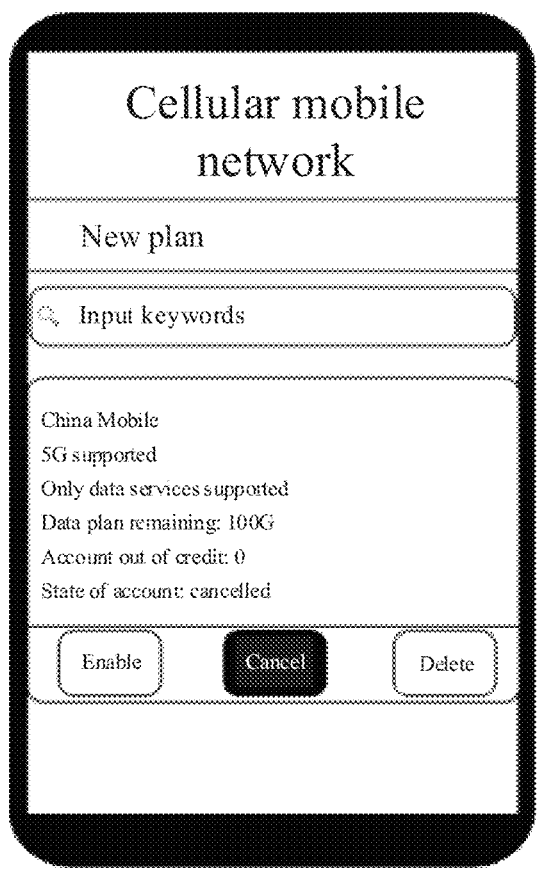
FIG. 10 is a schematic diagram of another screen according to an embodiment of this application.

For example, the electronic device may display a delete option on the screen shown in FIG. 10 after the profile is cancelled, to avoid a misoperation by the user. If the user taps the delete option on the screen shown in FIG. 10, the electronic device deletes the profile in response to a tap by the user on the delete option. In this case, the screen shown in FIG. 10 no longer includes relevant content about the profile, such as capability information of the profile and options related to the profile.

In addition, if the user has enabled the profile in a case that the account data plan of the profile is not used up and the account of the profile is not out of credit, and during use of the profile, the operator network detects that the account of the profile is out of credit, the field outofCredit in the profile metadata is enabled, so that the value of the outofCredit is used to indicate that the account of the profile is out of credit, and the electronic device is notified to update the outofCredit. For example, for a method for notifying the electronic device by the operator network to update the outofCredit, reference may be made to the method for notifying the electronic device by the operator network to update the profileCancelled shown in FIG. 11, and details are not repeated herein again.

Figure 12:
FIG. 12 is a schematic diagram of another screen according to an embodiment of this application.

The electronic device updates the capability information of the profile on the screen based on the updated outofCredit in the profile metadata. As an example, the screen for displaying profile capability information before the outofCredit is updated is the screen shown in FIG. 9. Then, the electronic device displays the updated screen on the display in response to the operation by the user of opening the screen shown in FIG. 9. For example, the updated screen may be as shown in FIG. 12, and the user may tap the account out of credit option so that the electronic device displays a top-up screen for the corresponding operator on the display. The user may top up by selecting a corresponding amount on the top-up screen according to his/her own needs. Or, the electronic device pops up a prompt window on the display after the outofCredit is updated. The prompt box is used to prompt the user that the account is out of credit and whether to make a payment. Reference may be made to related descriptions of the prompt window 2. Further, if the user does not make payment in the prompt window displayed on the display, the screen for displaying profile capability information is updated based on the updated outofCredit.

Similarly, if the user has enabled the profile in a case that the account data plan of the profile is not used up and the account of the profile is not out of credit, and during use of the profile, the operator network detects that the account data plan of the profile has been used up, the field outofDataPlan in the profile metadata is enabled, so that the value of the outofDataPlan is used to indicate that the account data plan of the profile has been used up, and the electronic device is notified to update the outofDataPlan. For example, for a method for notifying the electronic device by the operator network to update the outofDataPlan, reference may be made to the method for notifying the electronic device by the operator network to update the profileCancelled shown in FIG. 11, and details are not repeated herein again.

The electronic device updates the capability information of the profile on the screen based on the updated outofDataPlan in the profile metadata. As an example, the screen for displaying profile capability information before the outofDataPlan is updated is the screen shown in FIG. 9. Then, the electronic device displays the updated screen on the display in response to the operation by the user of opening the screen shown in FIG. 9. For example, the updated screen may be as shown in FIG. 12, and the user may tap the account out of credit option so that the electronic device displays a top-up screen for the corresponding operator on the display. The user may top up by selecting a corresponding amount on the top-up screen according to his/her own needs. Or, the electronic device pops up a prompt window on the display after the outofDataPlan is updated. The prompt box is used to prompt the user that the account is out of credit and whether to make a payment. Reference may be made to related descriptions of the prompt window 3. Further, if the user does not make payment in the prompt window displayed on the display, the screen for displaying profile capability information is updated based on the updated outofCredit.

It should be noted that the screens shown in FIG. 9, FIG. 10, and FIG. 12 are a same screen, but contents presented on the screen are different.

In addition, in this embodiment of this application, field(s) for characterizing profile capabilities are added to the profile metadata, so that the user can check whether the account is out of credit or whether the account data plan is used up through a profile management screen when the electronic device is unable to access the Internet or register. This helps to reduce the number of times that the user may complain to the device vendor because the electronic device is unable to access the Internet or register due to non-device quality problems.

It should be noted that the foregoing description takes nrProfile, onlyforIoT, outofCredit, outofDataPlan, and profileCancelled as examples of the fields for characterizing the profile capabilities. The fields for characterizing the profile capabilities may also include other fields, such as network standard indication, which is not limited.

Figure 13:
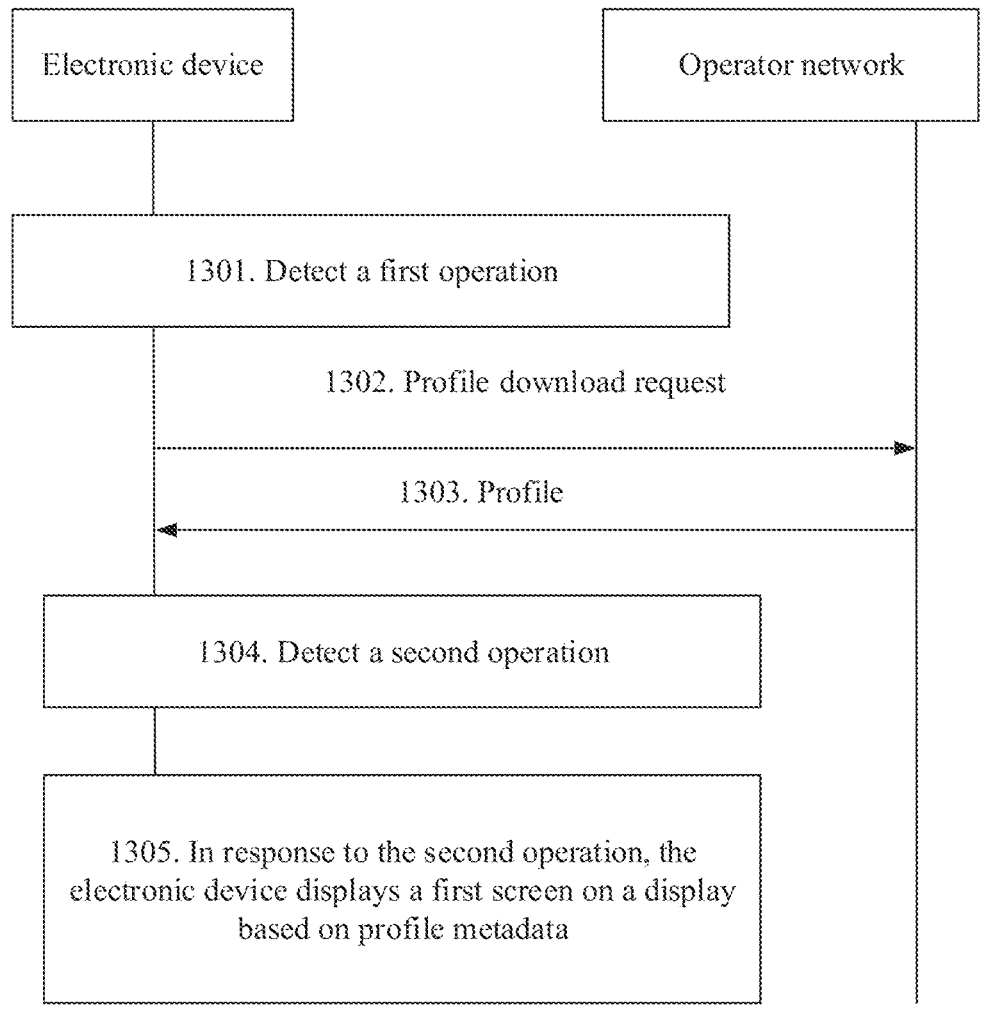
FIG. 13 is a schematic flowchart of a display method according to an embodiment of this application.

Based on the foregoing embodiments, an embodiment of this application provides a display method, which as shown in FIG. 13, specifically includes the following steps.

1301. The electronic device detects a first operation, where the first operation is used to request downloading a profile, the profile includes profile metadata, and the profile metadata includes at least one of a first field, a second field, a third field, a fourth field, and a fifth field. The first field is used to indicate a network standard supported by the profile, the second field is used to indicate a card type supported by the profile, the third field is used to indicate account balance information of the profile, the fourth field is used to indicate information about a remaining data volume of an account data plan of the profile, and the fifth field is used to indicate a state of an account of the profile. The state of the account of the profile indicates whether the account of the profile has been cancelled.

For example, for the first field, reference may be made to the related description of nrProfile; for the second field, reference may be made to the related description of onlyforIoT; for the third field, reference may be made to the related description of outofCredit; for the fourth field, reference may be made to the related description of outofDataPlan; and for the fifth field, reference may be made to the related description of profileCancelled.

It should be noted that the first operation may include a series of operations. Taking the screen shown in FIG. 3 as an example, for example, the first operation includes an operation of tapping the new plan option by the user, an operation of tapping the continue option on the screen C, an operation of tapping the agree option on the screen D, inputting corresponding real-name authentication information, and an operation of tapping the submit option on screen E. The first operation may alternatively be one operation. For example, the first operation may be an operation by the user of tapping a link pushed by an operator to the user through a short message for downloading a profile, or the like, which is not limited.

1302. In response to the first operation, the electronic device sends a profile download request to an operator network.

1303. The electronic device receives the profile from the operator network.

1304. The electronic device detects a second operation, where the second operation is used to open a first screen, and the first screen includes at least one of a first option, a second option, a third option, a fourth option, and a fifth option. The first option is used to indicate the network standard supported by the profile, the second option is used to indicate the card type supported by the profile, the third option is used to indicate the account balance information of the profile, the fourth option is used to indicate the information about the remaining data volume of an account data plan of the profile, and the fifth option is used to indicate the state of the account of the profile.

Taking the screen shown in FIG. 3 as an example, the second operation may be an operation of tapping the control 301. For another example, the second operation may alternatively be an operation of tapping the Cellular mobile network option on the screen A, and this embodiment of this application imposes no limitation on the operation of opening the first screen. For example, the second operation may alternatively be a voice command, a shortcut gesture operation, or the like.

1305. In response to the second operation, the electronic device displays the first screen on a display based on the profile metadata.

In some embodiments, if detecting that the first field is used to indicate that the network standard supported by the profile is a first network standard (for example, 5G), and/or the second field is used to indicate that the card type supported by the profile is a first card type (such as an Internet of Things card), the electronic device pops up a first prompt window on the display. The first prompt window includes first prompt information, an enable option, and a cancel option. The first prompt information is used to prompt the user the network standard and/or card type supported by the profile, and whether to enable the network standard and/or card type. In response to an operation of tapping the enable option by the user, the profile is enabled. In response to an operation of tapping the cancel option by the user, the electronic device hides the first prompt window on the display.

In some other embodiments, if detecting that the third field is used to indicate that the account of the profile is out of credit, the electronic device pops up a second prompt window on the display. The second prompt window includes second prompt information, a quit option, and an agree option. The second prompt information is used to prompt the user that the account of the profile is out of credit and whether to make a payment. In response to an operation of tapping the agree option by the user, the electronic device displays a top-up screen on the display, so that the user may top up according to his/her own needs. In response to an operation of tapping the quit option by the user, the electronic device hides the second prompt window on the display.

In some other embodiments, if detecting that the fourth field is used to indicate that the account data plan of the profile has been used up, the electronic device pops up a third prompt window on the display. The third prompt window includes third prompt information, a quit option, and an agree option. The third prompt information is used to indicate that the account data plan of the profile has been used up and whether to top up data. In response to an operation of tapping the agree option by the user, the electronic device displays a data top-up screen on the display, so that the user may purchase data according to his/her own needs. In response to an operation of tapping the quit option by the user, the electronic device hides the third prompt window on the display.

In some other embodiments, if detecting that the fifth field is used to indicate that the account of the profile has been cancelled, the electronic device pops up a fourth prompt window on the display. The fourth prompt window includes fourth prompt information, a cancel option, and an agree option. The fourth prompt information is used to prompt the user that the account of the profile has been cancelled and whether to delete the account. In response to an operation of tapping the agree option by the user, the electronic device deletes the profile. In response to an operation of tapping the cancel option by the user, the electronic device hides the fourth prompt window on the display.

In some other embodiments, the electronic device receives an update notification of the third field from the operator network and based on the update notification of the third field, the electronic device updates the account balance information of the profile indicated by the third option included on the first screen. The electronic device may display a top-up screen on the display in response to an operation of tapping the third option by the user when the account of the profile indicated by the third option is out of credit.

In some other embodiments, the electronic device receives an update notification of the fourth field from the operator network and based on the update notification of the fourth field, the electronic device updates the information about the remaining data volume of the account data plan of the profile indicated by the fourth option included on the first screen. The electronic device may display a data top-up screen on the display in response to an operation of tapping the fourth option by the user when the account data plan of the profile indicated by the fourth option has been used up.

The foregoing embodiments may be used separately or in combination, to achieve different technical effects.

In the foregoing embodiments provided in this application, the communication methods provided in the embodiments of this application are described from a perspective in which a terminal serves as an execution body. To implement functions in the communication methods provided in the embodiments of this application, the terminal may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on a specific application and a design constraint condition of the technical solutions.

Figure 14:
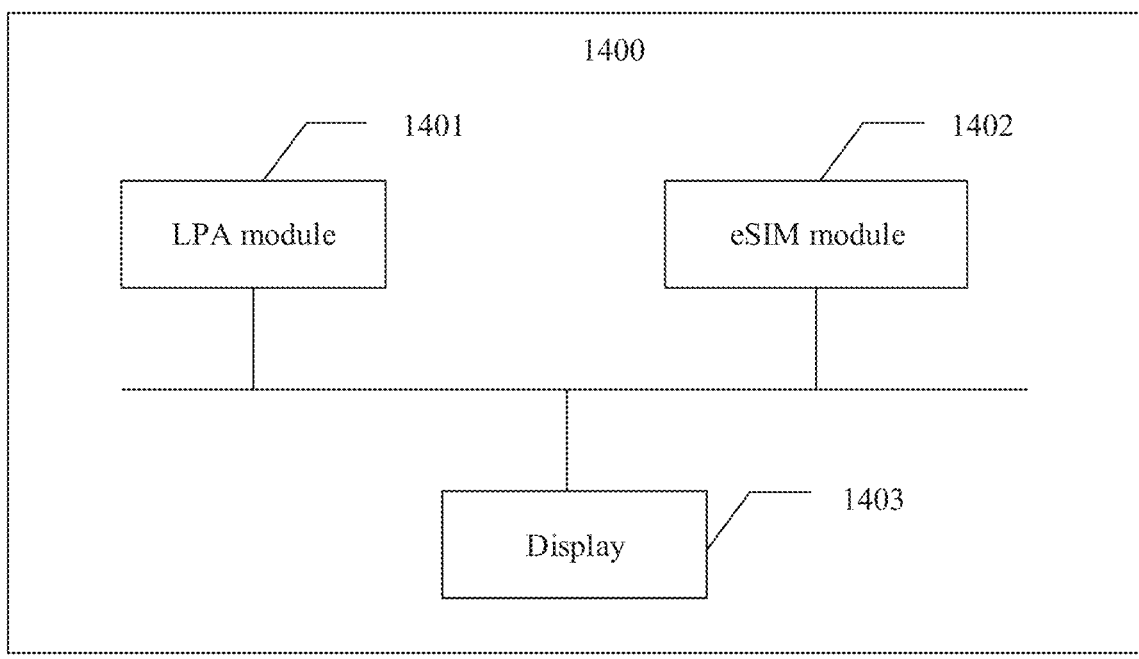
FIG. 14 is a schematic structural diagram of another electronic device according to an embodiment of this application.

Based on a same concept, as shown in FIG. 14, an embodiment of this application further provides an electronic device 1400, where the electronic device 1400 includes an LPA module 1401, an eSIM module 1402, and a display 1403.

The LPA module 1401 is configured to detect a first operation, and trigger the eSIM module to send a profile download request to an operator network, where the first operation is used to request downloading a profile, the profile includes profile metadata, and the profile metadata includes at least one of a first field, a second field, a third field, a fourth field, and a fifth field; and the first field is used to indicate a network standard supported by the profile, the second field is used to indicate a card type supported by the profile, the third field is used to indicate the account balance information of the profile, the fourth field is used to indicate information about a remaining data volume of an account data plan of the profile, and the fifth field is used to indicate a state of an account of the profile.

The eSIM module 1402 is configured to receive the profile from the operator network.

The LPA module 1401 is further configured to detect a second operation and trigger displaying a first screen on the display 1403 based on the profile metadata, where the second operation is used to open the first screen, and the first screen includes at least one of a first option, a second option, a third option, a fourth option, and a fifth option. The first option is used to indicate the network standard supported by the profile, the second option is used to indicate the card type supported by the profile, the third option is used to indicate the account balance information of the profile, the fourth option is used to indicate the information about the remaining data volume of an account data plan of the profile, and the fifth option is used to indicate the state of the account of the profile.

For specific execution processes of the LPA module 1401, the eSIM module 1402, and the display screen 1403, reference may be made to the descriptions in the foregoing method embodiments. Division of the modules in the embodiments of this application is merely an example for illustration, and is only logical function division, which may be other division in actual implementation. In addition, the functional modules in the embodiments of this application may be integrated into one processor or exist alone physically, or two or more modules may be integrated into one module. The integrated module may be implemented in a form of hardware, or may be implemented in a form of a software functional module.

Figure 15:
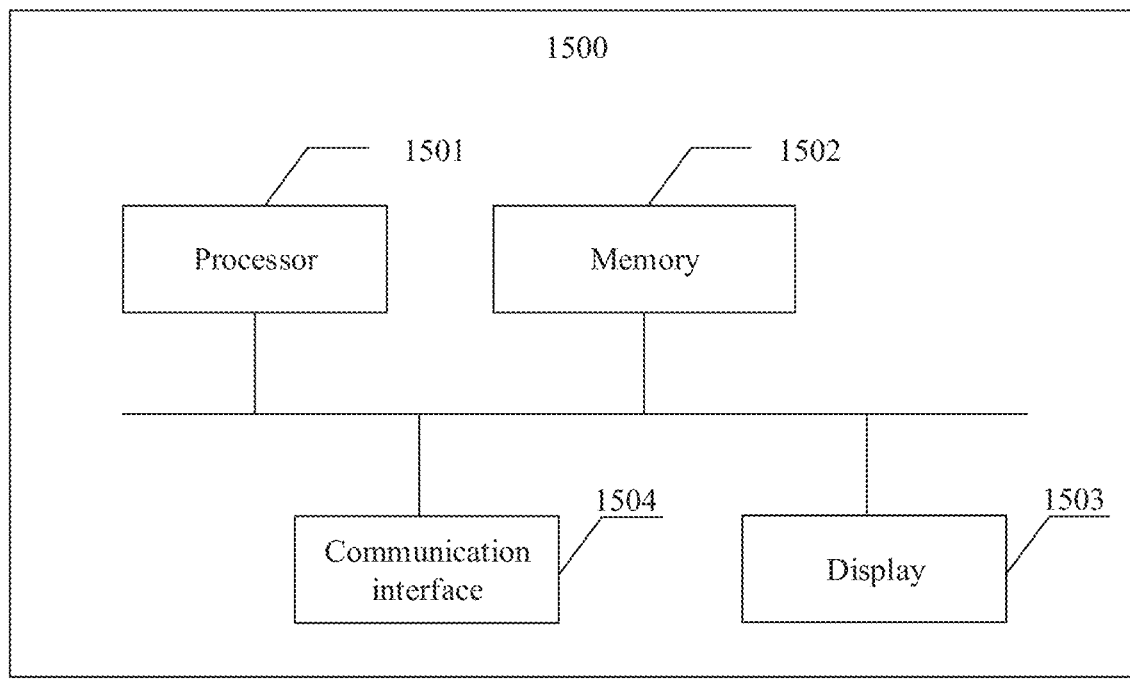
FIG. 15 is a schematic structural diagram of another electronic device according to an embodiment of this application.

Based on a same concept, as shown in FIG. 15, an embodiment of this application further provides an electronic device 1500.

In an example, the electronic device 1500 is configured to perform the steps performed by an electronic device in the foregoing method. The electronic device 1500 includes at least one processor 1501, configured to implement functions of the electronic device in the foregoing method. For example, the processor 1501 may be configured to trigger displaying a first screen in response to a second operation, where the first screen includes at least one of a first option, a second option, a third option, a fourth option, and a fifth option. The first option is used to indicate the network standard supported by the profile, the second option is used to indicate the card type supported by the profile, the third option is used to indicate the account balance information of the profile, the fourth option is used to indicate the information about the remaining data volume of an account data plan of the profile, and the fifth option is used to indicate the state of the account of the profile. For details, refer to detailed descriptions in the method which are not repeated herein.

In some embodiments, the electronic device 1500 may further include at least one memory 1502 configured to store a computer program. The memory 1502 and the processor 1501 are coupled. The coupling in the embodiments of this application is a spaced coupling or a communication connection between apparatuses, units or modules, may be in electrical, mechanical or other forms, and is used for information exchange between apparatuses, units or modules. As another implementation, the memory 1502 may further be located outside the electronic device 1500. The processor 1501 may cooperate with the memory 1502 The processor 1501 may execute the computer program stored in the memory 1502. At least one of the at least one memory may be included in the processor.

In some embodiments, the electronic device 1500 may further include a display 1503. The display 1503 is configured to open a first screen, a prompt box, or the like.

In some embodiments, the electronic device 1500 may further include a communication interface 1504 for communicating with other devices through a transmission medium, so that modules in the electronic device 1500 can communicate with other devices. For example, the communication interface 1504 may be a transceiver, circuit, bus, module, or a communication interface of another type, and the other devices may be other terminals or network devices. The processor 1501 uses the communication interface 1504 to send and receive information and is configured to implement the method in the foregoing embodiments. For example, the communication interface 1504 may be configured to receive the profile from the operator network.

This embodiment of this application does not limit a connection medium between the communications interface 1504, the display 1503, the processor 1501, and the memory 1502. For example, in this embodiment of this application, the memory 1502, the display 1503, the processor 1501, and the communication interface 1504 in FIG. 15 are connected by a bus. The bus may be classified into an address bus, a data bus, a control bus, and the like.

In this embodiment of this application, the processor may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module.

In this embodiment of this application, the memory may be a nonvolatile memory, for example, a hard disk drive (HDD) or a solid-state drive (SSD); or may be a volatile memory, for example, a random-access memory (RAM). The memory is any other medium that can be used to carry or store expected program code in a form of an instruction or a data structure and that is accessible to a computer, but is not limited thereto. The memory in this embodiment of this application may alternatively be a circuit or any other apparatus capable of realizing a storage function, for storing program instructions and/or data.

In the method provided in this embodiment of this application, all or some of the method steps may be implemented by using software, hardware, firmware, or any combination thereof. When implemented by software, all or some of the method steps may be implemented in a form of a computer program product. The computer program product includes one or more computer instructions. When the computer program instructions are loaded and executed on the computer, the procedure or functions according to the embodiments of the present disclosure are all or partially generated.

The computer may be a general-purpose computer, a special-purpose computer, a computer network, a network device, user equipment, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a SSD), or the like.

Obviously, a person skilled in the art can make various modifications and variations to this application without departing from the scope of this application. This application is intended to cover these modifications and variations provided that they fall within the scope of protection defined by the following claims and their equivalent technologies of this application.

What is claimed is:

1. A display method, wherein the method comprises:
   detecting, by an electronic device, a first operation, wherein the first operation is used to request downloading an eSIM profile, wherein the eSIM profile comprises profile metadata, and the eSIM profile metadata comprises at least one of a first field, a second field, a third field, a fourth field, or a fifth field, and wherein the first field is used to indicate a network standard supported by the eSIM profile, the second field is used to indicate a card type supported by the eSIM profile, the third field is used to indicate account balance information of the eSIM profile, the fourth field is used to indicate information about a remaining data volume of an account data plan of the eSIM profile, and the fifth field is used to indicate a state of an account of the eSIM profile;
   in response to detecting the first operation, sending, by the electronic device, a profile download request to an operator network;
   receiving, by the electronic device, the eSIM profile from the operator network;
   detecting, by the electronic device, a second operation, wherein the second operation is used to open a first screen, wherein the first screen comprises at least one of a first option, a second option, a third option, a fourth option, or a fifth option, and wherein the first option is used to indicate the network standard supported by the eSIM profile, the second option is used to indicate the card type supported by the eSIM profile, the third option is used to indicate the account balance information of the eSIM profile, the fourth option is used to indicate the information about the remaining data volume of the account data plan of the eSIM profile, and the fifth option is used to indicate the state of the account of the eSIM profile;
   in response to detecting the second operation, displaying, by the electronic device, the first screen on a display based on the eSIM profile metadata before the eSIM profile is enabled;
   based on eSIM profile metadata comprising the first field and/or the second field, displaying, by the electronic device, a first prompt window on the display based on the electronic device detecting that the first field is used to indicate that the network standard supported by the eSIM profile is a first network standard and/or that the second field is used to indicate that the card type supported by the eSIM profile is a first card type, wherein the first prompt window comprises first prompt information, an enable option, and a cancel option, wherein the first prompt information is used to prompt a user whether to enable a profile supporting the first network standard and/or the first card type, the enable option is used for the user to enable the eSIM profile, and the cancel option is used for the user to skip enabling the eSIM profile;
   enabling, by the electronic device, the eSIM profile in response to an operation of tapping the enable option by the user; and
   hiding, by the electronic device, the first prompt window on the display in response to an operation of tapping the cancel option by the user.

2. The method according to claim 1, further comprising:
   based on eSIM profile metadata comprising the third field, displaying, by the electronic device, a second prompt window on the display based on the electronic device detecting that the third field is used to indicate that the account of the eSIM profile is out of credit,
   wherein the second prompt window comprises second prompt information, a quit option, and an agree option, wherein the second prompt information is used to prompt the user that the account of the eSIM profile is out of credit and whether to make a payment, the agree option is used for the user to make a payment to the account, and the quit option is used for the user to skip making a payment to the account.

3. The method according to claim 2, further comprising:
   receiving, by the electronic device, an update notification of the third field from the operator network; and
   updating, by the electronic device based on the update notification of the third field, the account balance information of the eSIM profile indicated by the third option.

4. The method according to claim 3, further comprising:
   based on the account of the eSIM profile indicated by the third option being out of credit, displaying, by the electronic device, a top-up screen on the display in response to an operation of tapping the third option by the user.

5. The method according to claim 1, further comprising:
   based on eSIM profile metadata comprising the fourth field, displaying, by the electronic device, a third prompt window on the display based on the electronic device detecting that the fourth field is used to indicate that the account data plan of the eSIM profile has been used up,
   wherein the third prompt window comprises third prompt information, a quit option, and an agree option, wherein the third prompt information is used to prompt the user that the account data plan of the eSIM profile has been used up and whether to top up data, the agree option is used for the user to purchase data, and the quit option is used for the user to skip purchasing data.

6. The method according to claim 5, further comprising:
   receiving, by the electronic device, an update notification of the fourth field from the operator network; and updating, by the electronic device based on the update notification of the fourth field, the information about the remaining data volume of the account data plan of the eSIM profile indicated by the fourth option.

7. The method according to claim 6, further comprising: based on the account data plan of the eSIM profile indicated by the fourth option having been used up, displaying, by the electronic device, a data top-up screen on the display in response to an operation of tapping the fourth option by the user.

8. The method according to claim 1, further comprising: based on eSIM profile metadata comprising the fifth field, displaying, by the electronic device, a fourth prompt window on the display based on the electronic device detecting that the fifth field is used to indicate that the state of the account of the eSIM profile has been cancelled, wherein the fourth prompt window comprises fourth prompt information, a delete option, and a cancel option, wherein the fourth prompt information is used to prompt the user that the account of the eSIM profile has been cancelled and whether to delete the account, the delete option is used for the user to delete the eSIM profile, and the cancel option is used for the user to skip deleting the eSIM profile.

9. The method according to claim 1, wherein the first field is nrProfile, the second field is onlyforIoT, the third field is outofCredit, the fourth field is outofDataPlan, and the fifth field is profileCancelled.

10. An electronic device, comprising:
a display;
a processor; and
a memory, wherein a computer program is stored in the memory, and the processor is configured to call the computer program stored in the memory to execute the following steps:
detecting a first operation, wherein the first operation is used to request downloading a profile, wherein the eSIM profile comprises profile metadata, and the eSIM profile metadata comprises at least one of a first field, a second field, a third field, a fourth field, or a fifth field, and wherein the first field is used to indicate a network standard supported by the eSIM profile, the second field is used to indicate a card type supported by the eSIM profile, the third field is used to indicate account balance information of the eSIM profile, the fourth field is used to indicate information about a remaining data volume of an account data plan of the eSIM profile, and the fifth field is used to indicate a state of an account of the eSIM profile;
in response to detecting the first operation, sending a profile download request to an operator network;
receiving the eSIM profile from the operator network;
detecting a second operation, wherein the second operation is used to open a first screen, wherein the first screen comprises at least one of a first option, a second option, a third option, a fourth option, or a fifth option, and wherein the first option is used to indicate the network standard supported by the eSIM profile, the second option is used to indicate the card type supported by the eSIM profile, the third option is used to indicate the account balance information of the eSIM profile, the fourth option is used to indicate the information about the remaining data volume of an account data plan of the eSIM profile, and the fifth option is used to indicate the state of the account of the eSIM profile;
in response to detecting the second operation, displaying the first screen on the display based on the eSIM profile metadata before the eSIM profile is enabled;
based on eSIM profile metadata comprising the first field and/or the second field, displaying, by the electronic device, a first prompt window on the display based on the electronic device detecting that the first field is used to indicate that the network standard supported by the eSIM profile is a first network standard and/or that the second field is used to indicate that the card type supported by the eSIM profile is a first card type, wherein the first prompt window comprises first prompt information, an enable option, and a cancel option, wherein the first prompt information is used to prompt a user whether to enable a profile supporting the first network standard and/or the first card type, the enable option is used for the user to enable the eSIM profile, and the cancel option is used for the user to skip enabling the eSIM profile;
enabling, by the electronic device, the eSIM profile in response to an operation of tapping the enable option by the user; and
hiding, by the electronic device, the first prompt window on the display in response to an operation of tapping the cancel option by the user.

11. The electronic device according to claim 10, wherein the processor calls the computer program stored in the memory to further execute the following step:
based on eSIM profile metadata comprising the third field, displaying a second prompt window on the display based on the electronic device detecting that the third field is used to indicate that the account of the eSIM profile is out of credit,
wherein the second prompt window comprises second prompt information, a quit option, and an agree option, wherein the second prompt information is used to prompt the user that the account of the eSIM profile is out of credit and whether to make a payment, the agree option is used for the user to make a payment to the account, and the quit option is used for the user to skip making a payment to the account.

12. The electronic device according to claim 11, wherein the processor calls the computer program stored in the memory to further execute the following steps:
receiving an update notification of the third field from the operator network; and
based on the update notification of the third field, updating the account balance information of the eSIM profile indicated by the third option.

13. The electronic device according to claim 12, wherein the processor calls the computer program stored in the memory to further execute the following step:
based on the account of the eSIM profile indicated by the third option being out of credit, displaying a top-up screen on the display in response to an operation of tapping the third option by the user.

14. The electronic device according to claim 10, wherein the processor calls the computer program stored in the memory to further execute the following step:
based on eSIM profile metadata comprising the fourth field, displaying a third prompt window on the display based on the electronic device detecting that the fourth field is used to indicate that the account data plan of the eSIM profile has been used up, wherein the third prompt window comprises third prompt information, a quit option, and an agree option, wherein the third prompt information is used to prompt the user that the account data plan of the eSIM profile has been used up and whether to top up data, the agree option is used for the user to purchase data, and the quit option is used for the user to skip purchasing data.

15. The electronic device according to claim 14, wherein the processor calls the computer program stored in the memory to further execute the following steps:

receiving an update notification of the fourth field from the operator network; and based on the update notification of the fourth field, updating the information about the remaining data volume of the account data plan of the eSIM profile indicated by the fourth option.

16. The electronic device according to claim 15, wherein the processor calls the computer program stored in the memory to further execute the following step:

based on the account data plan of the eSIM profile indicated by the fourth option having been used up, displaying a data top-up screen on the display in response to an operation of tapping the fourth option by the user.

17. The electronic device according to claim 10, wherein the processor calls the computer program stored in the memory to further execute the following step:

based on eSIM profile metadata comprising the fifth field, displaying a fourth prompt window on the display based on the electronic device detecting that the fifth field is used to indicate that the state of the account of the eSIM profile has been cancelled, wherein the fourth prompt window comprises fourth prompt information, a delete option, and a cancel option, wherein the fourth prompt information is used to prompt the user that the account of the eSIM profile has been cancelled and whether to delete the account, the delete option is used for the user to delete the eSIM profile, and the cancel option is used for the user to skip deleting the eSIM profile.

18. The electronic device according to claim 10, wherein the first field is nrProfile, the second field is onlyforIoT, the third field is outofCredit, the fourth field is outofDataPlan, and the fifth field is profileCancelled.

* * * * *